(12) United States Patent
Zheng et al.

(10) Patent No.: US 11,309,535 B2
(45) Date of Patent: Apr. 19, 2022

(54) ELECTRODES FOR BATTERIES

(71) Applicant: THE HONG KONG POLYTECHNIC UNIVERSITY, Hong Kong (CN)

(72) Inventors: Zijian Zheng, Hong Kong (CN); Jian Chang, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 0 days.

(21) Appl. No.: 16/023,176

(22) Filed: Jun. 29, 2018

(65) Prior Publication Data
US 2019/0190004 A1 Jun. 20, 2019

Related U.S. Application Data

(60) Provisional application No. 62/599,815, filed on Dec. 18, 2017.

(51) Int. Cl.
H01M 4/134 (2010.01)
H01M 4/38 (2006.01)
(Continued)

(52) U.S. Cl.
CPC .......... H01M 4/134 (2013.01); H01M 4/382 (2013.01); H01M 4/5815 (2013.01); H01M 4/621 (2013.01); H01M 4/625 (2013.01); H01M 4/66 (2013.01); H01M 4/667 (2013.01); H01M 10/052 (2013.01); H01M 10/0525 (2013.01)

(58) Field of Classification Search
None
See application file for complete search history.

(56) References Cited

U.S. PATENT DOCUMENTS

| 5,750,289 A | 5/1998 | Kejha |
| 2011/0104571 A1* | 5/2011 | Zhamu et al. |

(Continued)

FOREIGN PATENT DOCUMENTS

| CN | 102867940 A | * | 1/2013 |
| CN | 102121194 B | * | 8/2013 |

(Continued)

OTHER PUBLICATIONS

International Search Report and Written Opinion of PCT application No. PCT/CN2018/119339 issued from the International Search Authority dated Feb. 27, 2019.

(Continued)

Primary Examiner — Zhongqing Wei
(74) Attorney, Agent, or Firm — Spruson & Ferguson (Hong Kong) Limited

(57) ABSTRACT

Provided herein are a lithium electrode and a sulfur electrode for batteries. The lithium electrode comprises lithium metal and a metal-coated fabric. The fibers of the metal-coated fabric are covered by a metal layer, on which the lithium metal is attached. The sulfur electrode comprises a sulfur composite and a nickel-coated fabric. The fibers of the nickel-coated fabric are covered by a nickel layer, on which the sulfur composite is attached. The lithium electrode can inhibit dendrite formation and the sulfur electrode can speed up the redox kinetics of soluble polysulfides.

5 Claims, 33 Drawing Sheets

(51) Int. Cl.
*H01M 4/58* (2010.01)
*H01M 10/0525* (2010.01)
*H01M 4/62* (2006.01)
*H01M 4/66* (2006.01)
*H01M 10/052* (2010.01)

(56) References Cited

U.S. PATENT DOCUMENTS

| | | | |
|---|---|---|---|
| 2015/0147641 | A1 | 5/2015 | Abd Elhamid et al. |
| 2015/0255769 | A1 | 9/2015 | Li |
| 2016/0268587 | A1* | 9/2016 | Nam ............ H01M 4/133 |

FOREIGN PATENT DOCUMENTS

| | | | |
|---|---|---|---|
| CN | 104638246 A | | 5/2015 |
| CN | 104659430 A | | 5/2015 |
| CN | 104766943 A | | 7/2015 |
| CN | 105098143 A | | 11/2015 |
| CN | 105552302 A | | 5/2016 |
| CN | 106532026 A | * | 3/2017 |
| CN | 106898729 A | * | 6/2017 |
| CN | 106898729 A | | 6/2017 |
| CN | 102867940 A | | 1/2019 |

OTHER PUBLICATIONS

Atzori, L., Iera, A. & Morabito, G. The Internet of Things: A survey. Comput. Netw. 54, 2787-2805 (2010).
Service, R.F. Technology. Electronic textiles charge ahead. Science 301, 909-911 (2003).
Zeng, W. et al. Fiber-based wearable electronics: a review of materials, fabrication, devices, and applications. Adv. Mater. 26, 5310-5336 (2014).
Chen, J. et al. Micro-cable structured textile for simultaneously harvesting solar and mechanical energy. Nat Energy 1, 16138 (2016).
Jost, K. et al. Knitted and screen printed carbon-fiber supercapacitors for applications in wearable electronics. Energ Environ Sci 6, 2698-2705 (2013).
Peng, H.J., Huang, J.Q. & Zhang, Q. A review of flexible lithium-sulfur and analogous alkali metal-chalcogen rechargeable batteries. Chem Soc Rev 46, 5237-5288 (2017).
Kim, S.W. et al. Graphite/silicon hybrid electrodes using a 3D current collector for flexible batteries. Adv Mater 26, 2977-2982 (2014).
Zhou, G., Li, F. & Cheng, H.-M. Progress in flexible lithium batteries and future prospects. Energ Environ Sci 7, 1307-1338 (2014).
Bruce, P.G., Freunberger, S.A., Hardwick, L.J. & Tarascon, J.M. Li-O2 and Li—S batteries with high energy storage. Nature Materials 11, 19-29 (2011).
Lin, D., Liu, Y. & Cui, Y. Reviving the lithium metal anode for high-energy batteries. Nature Nanotechnology 12, 194-206 (2017).
Xu, W. et al. Lithium metal anodes for rechargeable batteries. Energ Environ Sci 7, 513-537 (2014).
Liang, Z. et al. Composite lithium metal anode by melt infusion of lithium into a 3D conducting scaffold with lithiophilic coating. Proceedings of the National Academy of Sciences of the United States of America 113, 2862-2867 (2016).
Tao, Y. et al. Kinetically-enhanced polysulfide redox reactions by Nb2O5 nanocrystals for high-rate lithium-sulfur battery. Energ Environ Sci 9, 3230-3239 (2016).
Zheng, G. et al. Interconnected hollow carbon nanospheres for stable lithium metal anodes. Nat. Nanotechnol. 9, 318-623 (2014).
Liu, Y. et al. An Artificial Solid Electrolyte Interphase with High Li-Ion Conductivity, Mechanical Strength, and Flexibility for Stable Lithium Metal Anodes. Adv. Mater. 29, 1605531 (2017).
Ding, F. et al. Dendrite-free lithium deposition via self-healing electrostatic shield mechanism. J Am Chem Soc 135, 4450-4456 (2013).
Zhang, Y. et al. Dendrite-free lithium deposition with self-aligned nanorod structure. Nano Lett 14, 6889-6896 (2014).
Li, W. et al. The synergetic effect of lithium polysulfide and lithium nitrate to prevent lithium dendrite growth. Nature Communications 6, 7436 (2015).
Ji, X. et al. Spatially heterogeneous carbon-fiber papers as surface dendrite-free current collectors for lithium deposition. Nano Today 7, 10-20 (2012).
Yang, C.P., Yin, Y.X., Zhang, S.F., Li, N.W. & Guo, Y.G. Accommodating lithium into 3D current collectors with a submicron skeleton towards long-life lithium metal anodes. Nature Communications 6, 8058 (2015).
Mukherjee, R. et al. Defect-induced plating of lithium metal within porous graphene networks. Nature Communications 5, 3710 (2014).
Cao, J. et al. A Flexible Nanostructured Paper of a Reduced Graphene Oxide-Sulfur Composite for High-Performance Lithium-Sulfur Batteries with Unconventional Configurations. Adv Mater 28, 9629-9636 (2016).
Fang, X., Weng, W., Ren, J. & Peng, H. A Cable-Shaped Lithium Sulfur Battery. Adv Mater 28, 491-496 (2016).
Ji, X., Lee, K.T. & Nazar, L.F. A highly ordered nanostructured carbon-sulphur cathode for lithium-sulphur batteries. Nature Materials 8, 500-506 (2009).
Zhou, G. et al. A graphene foam electrode with high sulfur loading for flexible and high energy Li—S batteries. Nano Energy 11, 356-365 (2015).
Yuan, Z. et al. Powering Lithium-Sulfur Battery Performance by Propelling Polysulfide Redox at Sulfiphilic Hosts. Nano Lett 16, 519-527 (2016).
Sun, Z. et al. Conductive porous vanadium nitride/graphene composite as chemical anchor of polysulfides for lithium-sulfur batteries Nat Commun 8, 14627 (2017).
Lee, Y.H. et al. Wearable textile battery rechargeable by solar energy. Nano Lett 13, 5753-5761 (2013).
Jeschull, F., Brandell, D., Edstrom, K. & Lacey, M.J. A stable graphite negative electrode for the lithium-sulfur battery. Chemical Communications 51, 17100-17103 (2015).
Kim, H. et al. Exploiting Lithium-Ether Co-Intercalation in Graphite for High-Power Lithium-Ion Batteries. Advanced Energy Materials, 1700418 (2017).
Winter, M., Besenhard, J.O., Spahr, M.E. & Novak, P. Insertion electrode materials for rechargeable lithium batteries. Advanced Materials 10, 725-763 (1998).
Lin, D. et al. Layered reduced graphene oxide with nanoscale interlayer gaps as a stable host for lithium metal anodes. Nat Nanotechnol 11, 626-632 (2016).
Guo, R. et al. Matrix-assisted catalytic printing for the fabrication of multiscale, flexible, foldable, and stretchable metal conductors. Adv Mater 25, 3343-3350 (2013).
Liu, L., Yu, Y., Yan, C., Li, K. & Zheng, Z. Wearable energy-dense and power-dense supercapacitor yarns enabled by scalable graphene-metallic textile composite electrodes. Nat Commun 6, 7260 (2015).
Huang, Q., Wang, D. & Zheng, Z. Textile-Based Electrochemical Energy Storage Devices. Advanced Energy Materials 6 (2016).
Zuo, T.T. et al. Graphitized Carbon Fibers as Multifunctional 3D Current Collectors for High Areal Capacity Li Anodes. Adv Mater 29 (2017).
Vetter, J. et al. Ageing mechanisms in lithium-ion batteries. Journal of Power Sources 147, 269-281 (2005).
Kotal, M., Kim, J., Kim, K.J. & Oh, I.K. Sulfur and Nitrogen Co-Doped Graphene Electrodes for High-Performance Ionic Artificial Muscles. Adv Mater 28, 1610-1615 (2016).
Zheng, G. et al. Amphiphilic surface modification of hollow carbon nanofibers for improved cycle life of lithium sulfur batteries. Nano Lett 13, 1265-1270 (2013).
W. S. Hummers & Offeman., R.E. Preparation of Graphite Oxide. J Am Chem Soc 80, 1339-1339 (1958).
Chang, J. et al. Asymmetric Supercapacitors Based on Graphene/ MnO2 Nanospheres and Graphene/MoO3 Nanosheets with High Energy Density. Advanced Functional Materials 23, 5074-5083 (2013).
Extended European Search Report of European patent application No. 18892836.0 issued from the European Patent Office dated Aug. 4, 2021.

(56) References Cited

OTHER PUBLICATIONS

Kong et al.; Review of nanostructured current collectors in lithium-sulfur batteries; Nano Research; 2017; vol. 10, Issue 12; pp. 4027-4054; Springer.

* cited by examiner

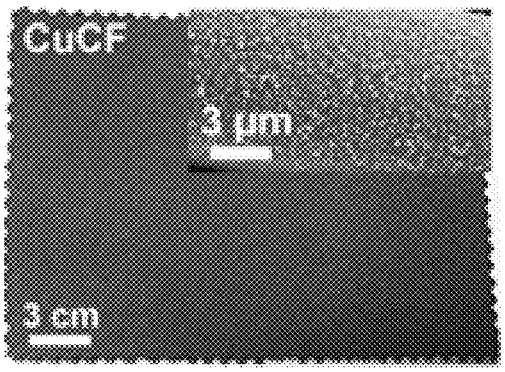
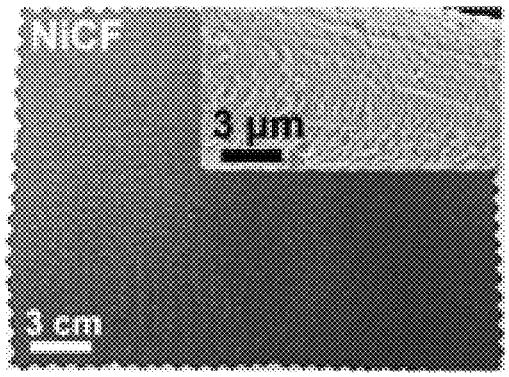
FIG. 8A        FIG. 8B
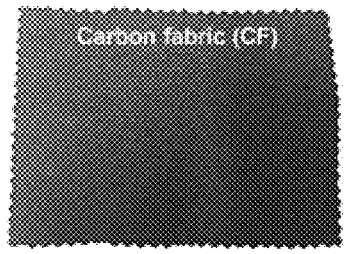
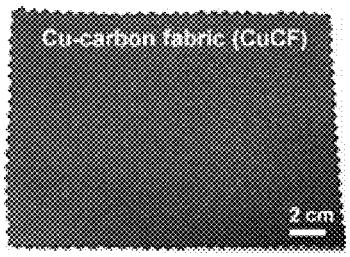
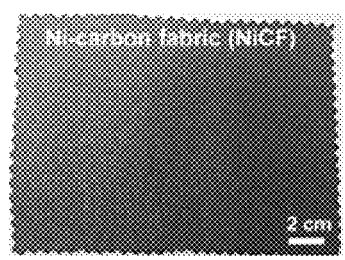
FIG. 9A                FIG. 9D                FIG. 9G
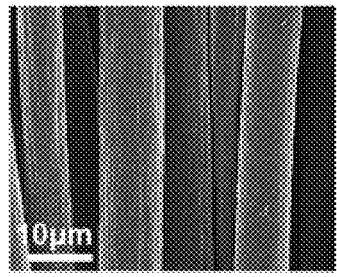
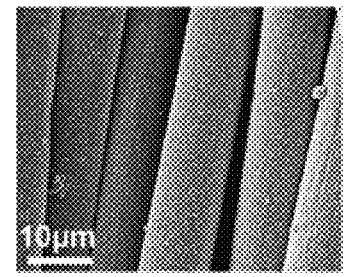
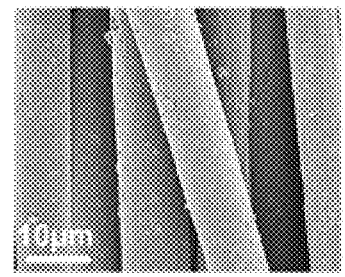
FIG. 9B                FIG. 9E                FIG. 9H
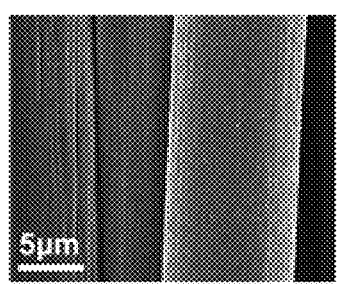
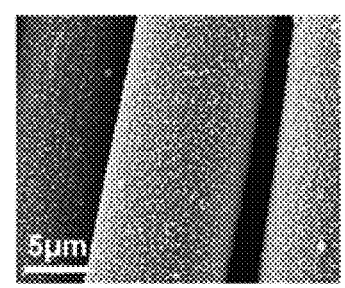
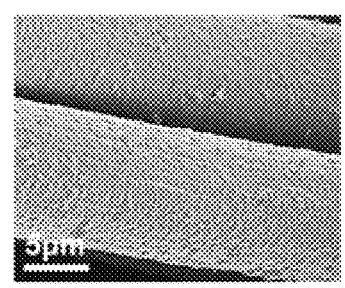
FIG. 9C                FIG. 9F                FIG. 9I

ELECTRODES FOR BATTERIES

CROSS-REFERENCE TO RELATED APPLICATIONS

The present application claims priority to and the benefit of U.S. Provisional Patent Application Ser. No. 62/599,815, which was filed on Dec. 18, 2017, and is hereby incorporated by reference in its entity.

TECHNICAL FIELD

The present disclosure generally relates to electrodes for batteries.

BACKGROND ART

Lithium-sulfur (Li—S) batteries show great promise as the next-generation high-energy-density batteries, because of their low mass densities (Li: 0.534 g cm$^{-3}$; S: 2.07 g cm$^{-3}$) and high theoretical capacities (Li: 3860 mAh kg$^{-1}$; S: 1675 mAh kg$^{-1}$). Stable Li—S batteries require high coulombic efficiency (CE) and high cycling stability of both anode and cathode.

However, dendrite formation on the Li metal anode and shuttle effects of soluble polysulfides on the cathode lead to low CE and rapid capacity decay of Li—S batteries. Li metal anodes face the issues of uncontrolled dendrite growth, large volume change, and unstable solid electrolyte interphase (SEI) in charge-discharge processes. Several strategies have been proposed to achieve stable Li metal anodes, including artificial SEI design, electrolyte additives, and high-surface-area Li hosts. The former two approaches may stabilize the surface of Li metal by physically or chemically inhibiting the dendrite formation. The latter is to reduce Li$^-$ flux and lower the localized current density with high-surface-area structures, which can improve the stability of SEI. Nevertheless, it is still difficult to realize high areal capacity and long cycle life of Li anodes with limited amount of Li source. On the cathode side, in order to resolve the shuttle effects of polysulfides, physical confinement approaches aiming to trap sulfur within porous hosts have been pursued, but the results in terms of capacity decay and kinetic sluggishness is still limited. Instead, metal oxides, sulfides, and even nitrides have been explored to accelerate reduction of the polysulfides (Li$_2$Sx, 3≤x≤8) and strengthen attachment of the sulfide (i.e., Li$_2$S, Li$_2$S$_2$). Nevertheless, the relatively low conductivity and insufficient catalytic effects adversely affect long-term cyclability of sulfur cathodes.

Apart from improving the coulombic efficiency and capacity, it is of paramount importance to fabricate Li—S electrodes with sufficient flexibility for flexible and wearable purposes. Up till now, only a limited number of flexible sulfur cathodes made with graphene and carbon nanotubes have been reported. However, there is no report on Li metal anodes with good flexibility. For example, sulfur cathodes are typically paired with thick Li metal foils or wires to test the electrochemical properties. Such an assembly does not have good flexibility, because of the low fatigue resistance of pure Li metal. As such, there is still no report to date for achieving flexible Li—S full cells with high energy density and stable cycling.

A need therefore exists for a lithium electrode and a sulfur electrode to eliminate or at least diminish the disadvantages and problems described above.

SUMMARY OF THE INVENTION

Provided herein is electrode for a battery. The electrode comprises lithium metal and a fabric comprising one or more fibers. Each of the one or more fibers being at least partially covered by a metal layer, and the lithium metal is attached on the metal layer.

In certain embodiments, the metal layer comprises copper, nickel, silver, zinc or gold.

In certain embodiments, the metal layer has a thickness in a range of 50 nm to 300 nm.

In certain embodiments, a portion of the lithium metal is in a form of a sheet or a flake.

In certain embodiments, the sheet has a lateral dimension in a range of 50 nm to 200 nm and a thickness in a range of 1-100 nm and the flake has a lateral dimension in a range of 1 μm to 5 μm and a thickness in a range of 1-100 nm.

In certain embodiments, the lithium metal is further present in pores in the fabric.

In certain embodiments, each of the one or more fibers comprises a diameter in a range of 5 μm to 20 μm.

In certain embodiments, the metal layer comprises copper; the metal layer has a thickness in a range of 50 nm to 300 nm; a portion of the lithium metal is in a form of a sheet or a flake; and the sheet has a lateral dimension in a range of 50 nm to 200 nm and a thickness in a range of 1-100 nm and the flake has a lateral dimension in a range of 1 μm to 5 μm and a thickness in a range of 1-100 nm.

Provided herein is an electrode for a battery. The electrode comprises a sulfur composite comprising a conductive binder and sulfur and a fabric comprising one or more fibers. Each of the one or more fibers being at least partially covered by a nickel layer, and the sulfur composite is attached on the nickel layer.

In certain embodiments, the nickel layer has a thickness in a range of 50 nm to 300 nm.

In certain embodiments, the conductive binder is a nitrogen and sulfur co-doped graphene.

In certain embodiments, the nitrogen and sulfur co-doped graphene has a molar ratio of nitrogen to sulfur in a range of 0.8:1.2 to 1.2:0.8.

In certain embodiments, the sulfur composite further comprises a conductive additive.

In certain embodiments, the conductive additive is carbon black.

In certain embodiments, the sulfur composite is further present in pores in the fabric.

In certain embodiments, the electrode further comprises an interfacial polymer layer sandwiched between the each of the one or more fibers and the nickel layer.

In certain embodiments, the nickel layer has a thickness in a range of 50 nm to 300 nm; the conductive binder is a nitrogen and sulfur co-doped graphene; and the sulfur composite further comprises carbon black.

Provided herein is a lithium metal sulfur battery. The lithium metal sulfur battery comprises an anode and a cathode. The anode comprises lithium metal and a first fabric comprising one or more first fibers. Each of the one or more first fibers being at least partially covered by a metal layer, and the lithium metal is attached on the metal layer. The cathode comprises a sulfur composite comprising a conductive binder and sulfur and a second fabric comprising one or more second fibers. Each of the one or more second fibers being at least partially covered by a nickel layer, and the sulfur composite is attached on the nickel layer.

In certain embodiments, the metal layer comprises copper, the conductive binder is a nitrogen and sulfur co-doped graphene; and the sulfur composite further comprises carbon black.

Provided herein is electrode for a battery. The electrode comprises a sulfur composite comprising a conductive binder and sulfur and one or more fibers. Each of the one or more fibers being at least partially covered by a nickel layer, and the sulfur composite is attached on the nickel layer.

These and other aspects, features and advantages of the present disclosure will become more fully apparent from the following brief description of the drawings, the drawings, the detailed description of certain embodiments and appended claims.

BRIEF DESCRIPTION OF DRAWINGS

The appended drawings contain figures of certain embodiments to further illustrate and clarify the above and other aspects, advantages and features of the present invention. It will be appreciated that these drawings depict embodiments of the invention and are not intended to limit its scope. The invention will be described and explained with additional specificity and detail through the use of the accompanying drawings in which:

FIG. 8A shows images of CuCF;

FIG. 8B shows images of NiCF;

FIG. 9A shows a digital image of pristine CF;

FIG. 9B shows a SEM image with low magnification of pristine CF;

FIG. 9C shows a SEM image with high magnification of pristine CF;

FIG. 9D shows a digital image of CuCF;

FIG. 9E shows a SEM image with low magnification of CuCF;

FIG. 9F shows a SEM image with high magnification of CuCF;

FIG. 9G shows a digital image of NiCF;

FIG. 9H shows a SEM image with low magnification of NiCF;

FIG. 9I shows a SEM image with high magnification of NiCF;

DETAILED DESCRIPTION OF THE INVENTION

As defined herein, a fabric comprises a fiber network made by interlacing fibers, threads or yarns and containing pores. Each thread or yarn is a bundle of fibers and its size can be changed by the number of fibers in the thread or yarn, the diameter of each fiber and the packing density of fibers.

The present disclosure generally relates to a lithium electrode, a sulfur electrode, and a battery comprising one of the lithium electrode and the sulfur electrode, or the both.

According to certain embodiments, the lithium electrode comprises a metal-coated fabric and lithium metal. The fibers of the metal-coated fabric are at least partially covered by a metal layer and the lithium metal is attached on the metal layer. The sulfur cathode comprises a nickel-coated fabric and a sulfur composite. The fibers of the nickel-coated fabric are at least partially covered by a nickel layer and the sulfur composite is attached on the nickel layer.

According to certain embodiments, the battery comprises the lithium electrode as an anode and the sulfur electrode as a cathode. The fabric structure of the anode and the cathode endows mechanical flexibility and reduces local current density, and the metal coating on the fibers significantly stabilize the electrode materials to reach remarkable coulombic efficiency. On the anode side, the metal coating renders uniform deposition of Li sheets instead of dendrites, and leads to a remarkable coulombic efficiency, e.g., an average CE>99.42% over 400 charge-discharge cycles with copper coating according to certain embodiments described herein. On the cathode side, the Ni coating can catalytically accelerate polysulfide reduction and strongly anchor $Li_2S$, which leads to an excellent capacity retention, e.g., a capacity retention >99.82% over 400 cycles according to certain embodiments described herein.

According to certain embodiments, a Li—S battery comprising the lithium anode and the sulfur cathode provides with high energy density (e.g., 6.3 mWh $cm^{-2}$), high areal capacity (e.g., 3.0 mAh $cm^{-2}$), large current density (e.g., 2.0 mA $cm^{-2}$) and excellent cycling stability (e.g., capacity retention per cycle: 99.89% for 260 cycles).

According to certain embodiments, a flexible and stable Li—S battery comprising the lithium anode and the sulfur cathode described herein is provided, which can maintain stable charge/discharge characteristics over 200 cycles and power large LED screens to display for tens of minutes even when repeatedly bent at small radii of curvature (e.g., 5.0 mm) with limited excess of Li.

Figures 1A, 1B:
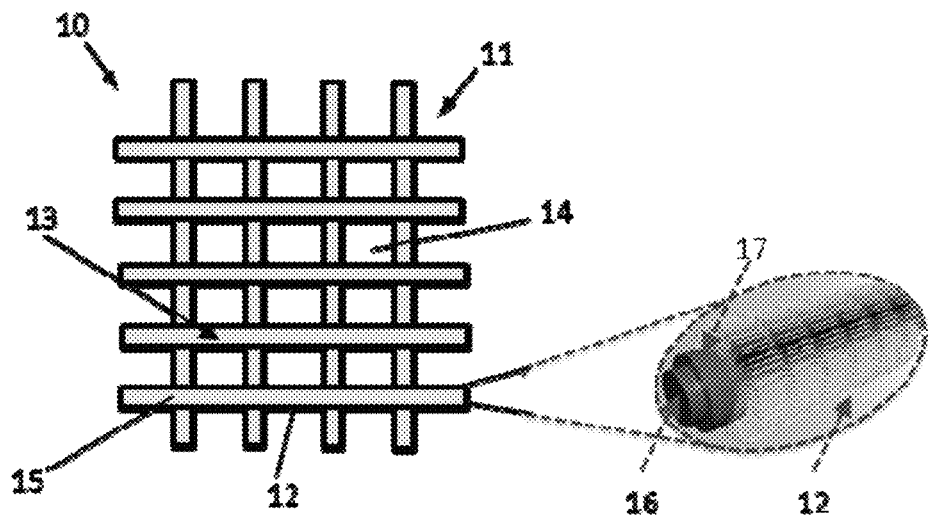
FIG. 1A shows a schematic diagram depicting a lithium electrode according to certain embodiments.
FIG. 1B shows a schematic diagram depicting a metal-coated fiber of the lithium electrode of FIG. 1A.

FIG. 1 shows a schematic diagram depicting a lithium electrode and a metal-coated fiber attached with Li metal according to certain embodiments. As shown in FIG. 1A, the lithium electrode 10 comprises a metal-coated fabric 11 and Li metal 12. The metal-coated fabric 11 has a fiber network 13 containing pores 14. The fiber network 13 comprises metal-coated fibers 15 which are interlaced to each other. As shown in FIG. 1B, the metal-coated fiber 15 is a fiber 16 partially or wholly covered by a metal layer 17. The Li metal 12 is attached on the metal layer 17. The Li metal can be in a form of particle, sheet or flake.

Figure 2:
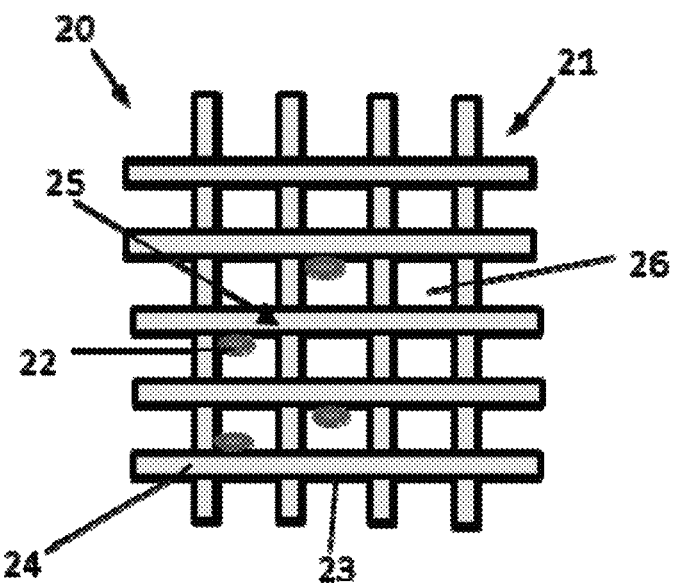
FIG. 2 shows a schematic diagram depicting a lithium anode according to certain embodiments.

FIG. 2 shows a schematic diagram depicting a lithium electrode according to certain embodiments. As shown in FIG. 2, the lithium electrode 20 comprises a metal-coated fabric 21, Li particles 22 and Li sheets or flakes 23. The metal-coated fabric 21 comprises metal-coated yarns 24, formed from bundles of fibers and interlaced to each other to form a fiber network 25. The fibers of the metal-coated yarns 24 are partially or wholly covered by a metal layer, on which the Li sheets and/or flakes 23 are attached. The Li particles 22 are present in pores 26 contained in the fiber network 25.

As the fibers in the fabric are covered by a metal layer, this coated metal layer can induce the nucleation and growth of lithium sheets and/or flakes instead of lithium dendrite. Compared to conventional metal foils, the metal-coated fabric described herein provides larger surface area due to the three-dimensional porous structure that can effectively reduce the local current density and further thin the deposited lithium during charge/discharge cycling. In the first few cycles, nanoscale lithium sheets are formed on the surface of fibers. After a large number of cycles (e.g., 100 cycles), most of the nanoscale lithium sheets are changed in to microscale lithium flakes. The thickness of the lithium sheets and flakes is very thin (e.g., 10~20 nm).

Various metals including copper, nickel, zinc, gold and silver can be substantially uniformly coated onto each fiber. In other words, each fiber in the fabric can be well covered with packed metal particles and layers. In addition, the fabric can provide many void spaces, e.g., the pores between yarns and the pores between fibers inside a yarn. Consequently, a large amount of Li metal can be electroplated onto the metallic fibers and in the pores between fibers or yarns, thus forming a three-dimensional composite fabric.

According to certain embodiments, copper is used for coating the fibers since copper does not form alloy with lithium metal and ions, thus avoiding any irreversible side reaction occurred.

The thickness of the metal layer can be in a range of 50 nm to 300 nm. If it is too thin, the large electrical resistance of fabric anode can induce large internal resistance and overheating of batteries. If it is too thick, the heavy electrode weight can reduce the energy density of batteries.

The lithium metal deposited in and on the metal-coated fabric can be in a form of particle, sheet or flake. A nanosheet/flake is a two-dimensional nanostructure with thickness on a scale ranging from 1-100 nm. A sheet/flake is not necessarily perfectly flat, but it is characterized by a plate-like form or structure. The initially deposited lithium metal mostly consists of Li spheres and flat Li sheets. After charging-discharge cycling, all the Li metal is changed into Li flakes.

Due to the large surface area of the porous structure leading to low local current density, lithium sheets and lithium flakes are preferentially formed instead of unfavorable lithium dendrites. Due to the void spaces provided by the porous structure, a large amount of lithium particles can be deposited inside the metal-coated fabric that also inhibits the dendrite formation.

In certain embodiments, the lithium sheets can have a lateral dimension in a range of 50 nm to 200 nm and a thickness in a range of 1 nm to 10 nm. The lithium flakes can have a lateral dimension in a range of 1 μm to 5 μm and a thickness in a range of 1 nm to 10 nm. The lithium particles can have a diameter in a range of 1 μm to 50 μm.

In certain embodiments, the lithium sheets can have a lateral dimension in a range of 100 nm to 150 nm and a thickness in a range of 3 nm to 7 nm. The lithium flakes can have a lateral dimension in a range of 2 μm to 4 μm and a thickness in a range of 3 nm to 7 nm. The lithium particles can have a diameter in a range of 10 μm to 30 μm.

Different kinds of fibers and fabrics, e.g., graphene, silk, cotton, polyester and polyimide, are suitable for forming the metal-coated fabric. In certain embodiments, carbon fibers, yarns and fabrics are used because the electrochemical performance of anode with the carbon fabric is better due to their higher chemical stability and electrochemical stability for stabilizing lithium metal and ions in batteries. The graphitic carbon fabrics derived by polyacrylonitrile (PAN), wood or bamboo can be used for providing better coulombic efficiency and cycling stability of the lithium electrode.

According to certain embodiments, the fiber in the fabric can have a diameter in a range of 5 μm to 20 μm. According certain embodiments, the diameter of the fiber is in a range of 5 μm to 10 μm.

According to certain embodiments, the metal layer is deposited on the fibers by electroless deposition (ELD). This metal coating technique is suitable for many kinds of fibers and fabrics, especially for carbon fibers, yarns, fabrics and papers.

Figure 3:
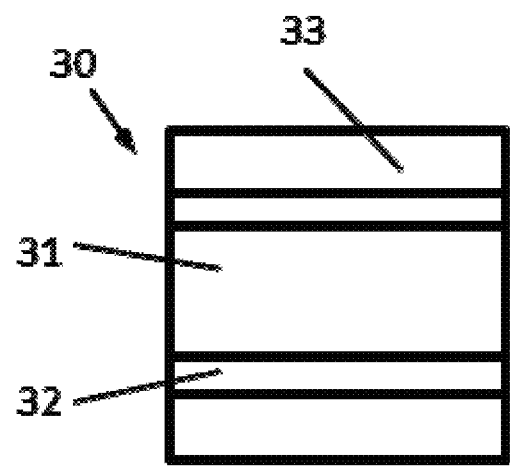
FIG. 3 shows a schematic diagram depicting a cross-section of a metal-coated fiber with an interfacial polymer layer according to certain embodiments.

A polymer-assisted metal deposition can optionally be used for fabricating the metal-coated fabric that is helpful to stabilize lithium metal according to certain embodiments. With this deposition method, an interfacial polymer layer can be formed between the fiber and the metal layer. As shown in FIG. 3, a metal-coated fiber 30 comprises a fiber 31, an interfacial polymer layer 32 and a metal layer 33. The interfacial polymer layer 32 is sandwiched by the fiber 31 and the metal layer 33.

The interfacial layer is useful for increasing interfacial bonding between the metal layer and the fiber or fabric and for enhancing the mechanical durability of the metal layer. The excellent elasticity and strength of metal-coated fabric can effectively release the internal stress during lithium deposition/dissolution process or during external mechanical bending. The coulombic efficiency of anode can also be enhanced with the interfacial layer.

As the lithium electrode is flexible due to the fabric structure, the lithium electrode of the present disclosure can be used in flexible batteries. Meanwhile, as the anode with very limited lithium excess (e.g. 6.0 mAh cm$^{-2}$) exhibits low weight, high coulombic efficiency, long cycling stability, and excellent specific capacity, it can also be used in non-flexible batteries.

The lithium electrode of the present disclosure can also act as an anode to be paired with cathodic air/oxygen ($O_2$), lithium cobalt oxide ($LiCoO_2$), lithium iron phosphate ($LiFePO_4$), manganese dioxide ($MnO_2$), vanadium pentoxide ($V_2O_5$) to assemble lithium batteries with different cathodes.

Figures 4A, 4B:
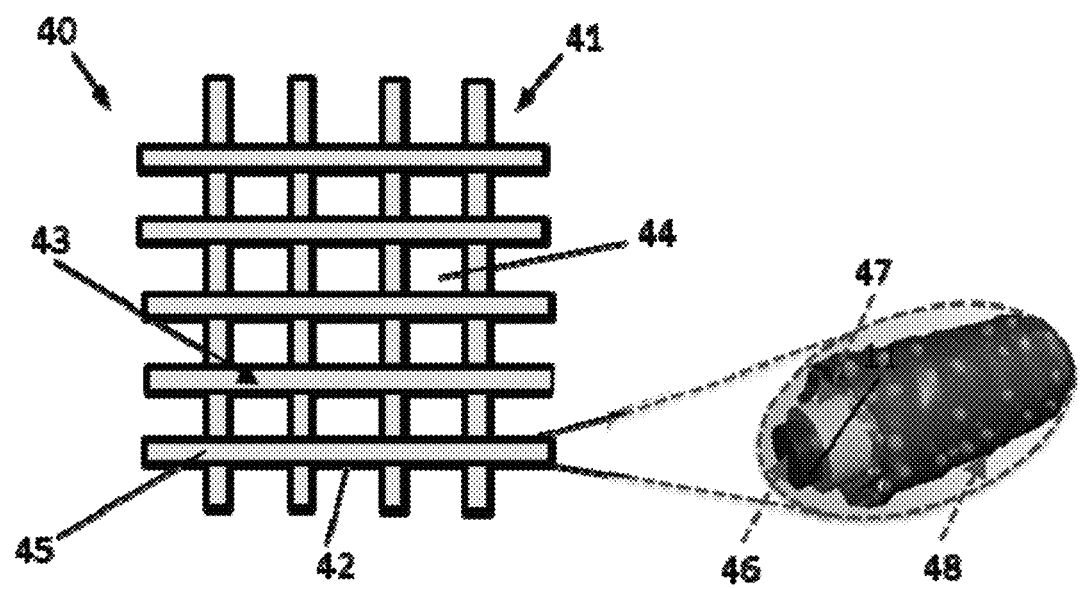
FIG. 4A shows a schematic diagram depicting a sulfur cathode according to certain embodiments.
FIG. 4B shows a schematic diagram depicting a Ni-coated fiber of the sulfur cathode of FIG. 4A.

FIG. 4 shows a schematic diagram depicting a sulfur electrode and a Ni-coated fiber attached with a sulfur composite according to certain embodiments. As shown in FIG. 4A, a sulfur electrode 40 comprises a Ni-coated fabric 41 and a sulfur composite 42. The sulfur composite 42 comprises sulfur and a conductive binder. The Ni-coated fabric 41 comprises a fiber network 43 containing pores 44. The fiber network 43 comprises Ni-coated fibers 45 which are interlaced to each other. As shown in FIG. 4B, the Ni-coated fiber 45 is a fiber 46 partially or wholly covered by a nickel layer 17. The sulfur composite 42 is attached on the nickel layer 17.

Figure 5:
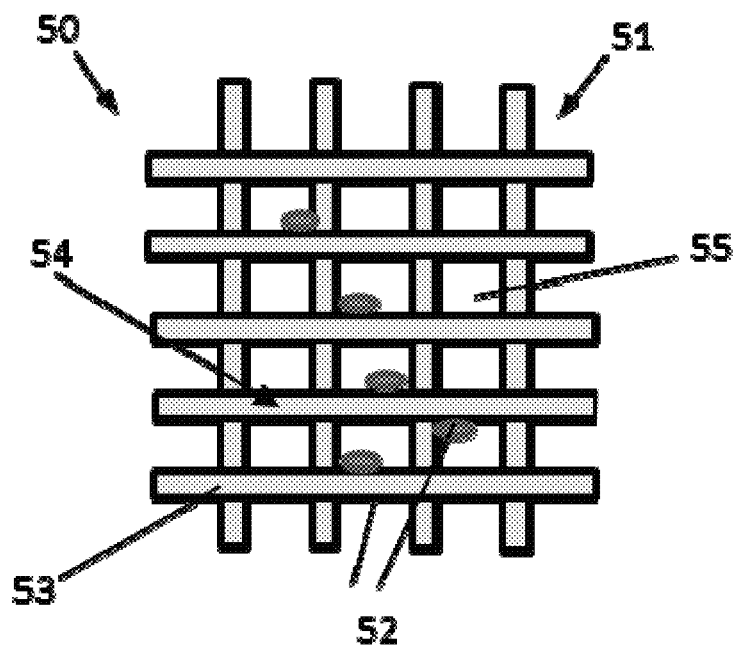
FIG. 5 shows a schematic diagram depicting a sulfur cathode according to certain embodiments.

FIG. 5 shows a schematic diagram depicting a sulfur electrode according to certain embodiments. As shown in FIG. 5, a sulfur electrode 50 comprises a Ni-coated fabric 51 and a sulfur composite 52. The Ni-coated fabric 51 comprises Ni-coated yarns 53, formed from bundles of fibers and interlaced to each other to form a fiber network 54. The fibers of the Ni-coated yarns 51 are partially or wholly covered by a Ni layer, on which the sulfur composite 52 is attached. The sulfur composite 52 is also present in pores 55 contained in the fiber network 54.

The nickel layer of the Ni-coated fabric can simultaneously speed up the redox kinetics of soluble polysulfides and solid $Li_2S$, resulting in high sulfur cycling utilization. Currently, no other metals have been shown to exhibit similar effects with nickel at nanoscale range. Furthermore, it was found that many metals, such as aluminum and iron, have heavy side reactions with sulfur active materials, limiting the use of them as sulfur cathodic electrode The thickness of the nickel layer can be in a range of 50 nm to 300 nm. If it is too thin, the large electrical resistance of fabric cathode can induce the large internal resistance and overheating of batteries. If it is too thick, the heavy electrode weight can reduce the energy density of batteries.

In certain embodiments, the conductive binder of the sulfur composite is a nitrogen and sulfur co-doped graphene (NSCG). The nitrogen and sulfur co-doped graphene has a large surface area to accommodate a large amount of soluble polysulfides, which aids in synergistically catalyzing redox conversion of polysulfides to $Li_2S$. Such polysulfide anchoring effect can result in high coulombic efficiency and long cyclability. In certain embodiments, the molar ratio of N to S in NSCG is in a range of 0.8:1.2 to 1.2:0.8. In certain embodiments, the molar ratio of N to S in NSCG is 1:1.

In certain embodiments, the sulfur composite further comprises a conductive additive, e.g., carbon black. In certain embodiments, the particle diameter, density, and BET surface area of the carbon black are in a range of 30 nm to 50 nm, a range of 0.1 g cm$^{-3}$ to 0.2 g cm$^{-3}$, and a range of 50 m$^2$ g$^{-1}$ to 70 m$^2$ g$^{-1}$ respectively. In certain embodiments, the particle diameter, density, and BET surface area of the carbon black are 40 nm, 0.16 g cm$^{-3}$, and 62 m$^2$ g$^{-1}$ respectively.

In certain embodiments, a mass ratio of sulfur/carbon black/NSCG is in a range of 6:2.5:1.5 to 8:1.5:0.5. In certain embodiments, a mass ratio of sulfur/carbon black/NSCG is 7:2:1.

Any fibers and fabrics known to those of skill in the art can be used to form the coated fiber or fabric. Suitable examples, include but are not limited to, graphene, silk, cotton, polyester, polyimide, and combinations thereof. In certain embodiments, the fabric is a carbon fabric. The carbon fabric can comprise graphitic, turbostratic or hybrid carbon. The carbon fabric can be derived by polyacrylonitrile (PAN), wood, bamboo, activated carbon (AC), graphene, pitch, or phenolic-derived carbon.

According to certain embodiments, the fiber in the fabric has a diameter in a range of 5 μm to 20 μm. In certain embodiments, the diameter of the fiber is in a range of 5 μm to 10 μm.

According to certain embodiments, the nickel layer is deposited on the fibers by electroless deposition (ELD). This nickel coating technique is suitable for many kinds of fibers and fabrics, especially for carbon fibers, yarns, fabrics and papers. A polymer-assisted metal deposition can be used for fabricating the Ni-coated fabric.

According to certain embodiments, the Ni-coated fiber further comprises an interfacial polymer layer sandwiched between the fiber and the nickel layer. The interfacial polymer can benefit the mechanical properties of the Ni coated fabric, e.g., elasticity and strength.

As the sulfur electrode is flexible due to its fabric structure, the sulfur electrode of the present disclosure can be used in flexible batteries. Meanwhile, as the sulfur electrode exhibits low weight, high coulombic efficiency, long cycling stability and excellent specific capacity, it can also be used in non-flexible batteries.

The sulfur electrode of the present disclosure can also act as a cathode to be paired with sodium- or magnesium-based anodes to assemble Na—S and Mg—S batteries respectively.

Figure 6:
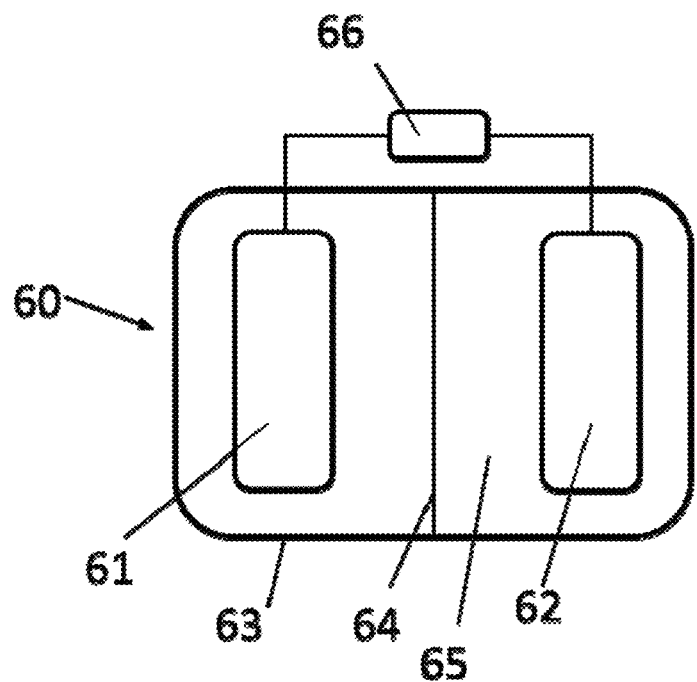
FIG. 6 shows a schematic diagram depicting a battery comprising the lithium anode of the present disclosure and the sulfur cathode of the present disclosure according to certain embodiments.

FIG. 6 shows a schematic diagram depicting a lithium metal sulfur battery comprising the lithium anode of the present disclosure and the sulfur cathode of the present disclosure according to certain embodiments. A lithium metal sulfur battery 60 comprises a lithium anode 61, a sulfur cathode 62, an enclosure 63, a separator 64 and an electrolyte 65. The battery 60 is connectable to an electrical device 66 for providing electric power.

The use of metal-coated fabrics with hierarchical core-shell nanostructures simultaneously guarantees high-efficiency and high-stability of the Li metal anode. The lithiated core of the graphitic carbon can serve as a Li source to offset irreversible Li loss during plating/tripping process and the metallic shell can act as mechanical and chemical protective layer to inhibit Li-ether co-intercalation into the graphitic carbon fabric. In addition, the Li host of the lithiated metal-coated fabric also inherits high surface area and high porosity, which is beneficial to lowering the local current density and mitigating the huge volume change during the Li metal plating/stripping process. An increased amount of Li nanoflakes are observed after cycling instead of Li dendrite formation.

The improved redox kinetics of the polysulfides and lithium sulfides by the Ni-coated fabric significantly enhanced CE and cycling stability of the cathode. The use of 3D hierarchical NSCG/$S_8$/Ni-coated fabric as a cathode for lithium sulfur batteries provides better polysulfides anchoring effects, resulting in high coulombic efficiency and long cyclability.

Design and Fabrication of Li—S Full Batteries

Figure 7:
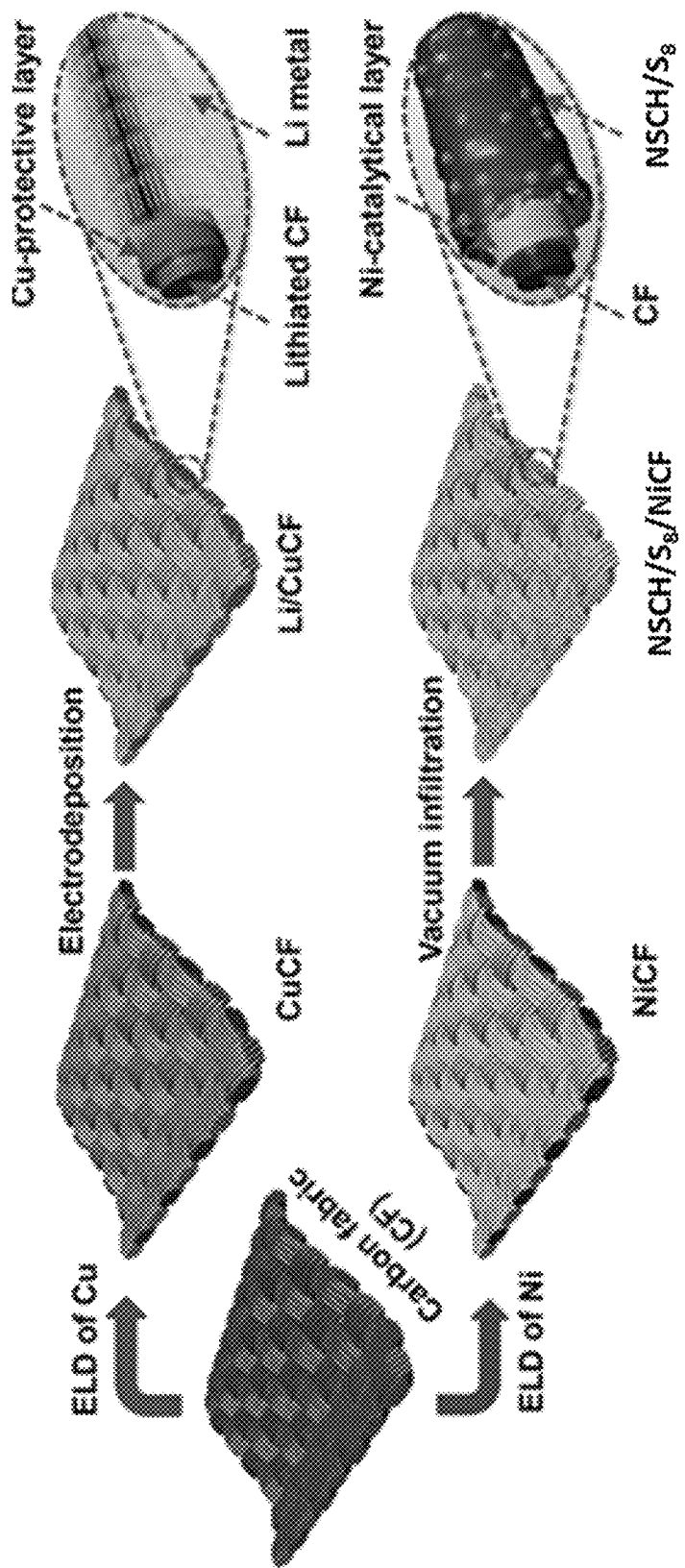
FIG. 7 shows a schematic illustration of the fabrication process and design principle of a lithium anode and a sulfur cathode according to certain embodiments.

FIG. 7 shows a schematic illustration of the fabrication process and design principle of a lithium anode and a sulfur cathode according to certain embodiments. To simultaneously endow mechanical durability and cycling stability of Li—S batteries described herein, chemically stable and highly conductive Cu/Ni thin layers are uniformly coated onto carbon fabrics (CuCF and NiCF) via a scalable polymer-assisted metal deposition (PAMD) method. After electrodeposition, the achieved Li/CuCF anode with Cu-protective layers and lithiated carbon can stabilize Li metal deposition and offset the irreversible Li loss during plating/stripping process. After infiltration, the NSCG/$S_8$/NiCF cathode with Ni-catalytical layers can simultaneously speed up the redox kinetics of soluble polysulfides and solid $Li_2S$.

A Li—S battery of the present disclosure was constructed as follows. Metal-coated carbon fabrics (CF) were fabricated as current collectors. CFs are known to be lightweight and flexible, but their high electrical resistance, chemical instability, and poor affinity to Li and sulfur are far from ideal. Therefore, a uniform layer of chemically stable and highly conductive Cu (for anode) or Ni (for cathode) was deposited onto CFs via a modified polymer-assisted metal deposition (PAMD) method as shown in FIG. 7. CFs were activated through an acid treatment to render the surface hydrophilic, followed by surface-initiated polymerization to form a 10-nm-thick surface functionalized polymer terminated with poly[2-(methacryloyloxy) ethyl] trimethyl ammonium chloride (PMETAC). The PMETAC layer acts as an interfacial layer to assist in immobilizing Pd, after which an electroless deposition (ELD) of dense metal nanoparticles onto the fabrics was carried out from the PMETAC layer.

FIGS. 8A and 8B shows digital images of CuCF and NiCF, and the corresponding enlarged metallic fibers are also observed in SEM images as shown in the inset.

For detailed comparison, FIGS. 9A-9C show digital and SEM images of a pristine CF, FIGS. 9D-9F show a digital and SEM images of a CuCF, and FIGS. 9G-9I show a digital and SEM images of a NiCF. As shown in the images, the Cu layer and the Ni layer are well coated on the CFs.

Figure 10:
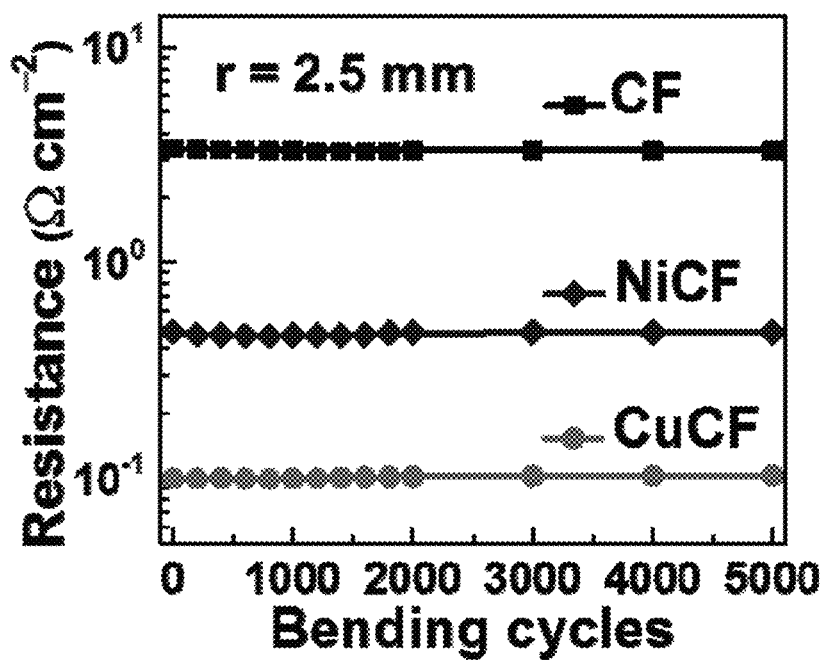
FIG. 10 shows sheet resistances of various fabrics (CF, CuCF, and NiCF) as a function of bending cycles at a given bending radius (r=2.5 mm)

FIG. 10 shows sheet resistances of various fabrics (CF, CuCF, and NiCF) as a function of bending cycles at a given bending radius (r=2.5 mm). Both NiCF and CuCF show exceedingly low sheet resistance of 0.48 and 0.1 $\Omega cm^{-2}$, which are one order of magnitude lower than that (3.04 $\Omega cm^{-2}$) of pristine CF, and the resistance remains unchanged even after bending the CuCF 5,000 times.

Figure 11A:
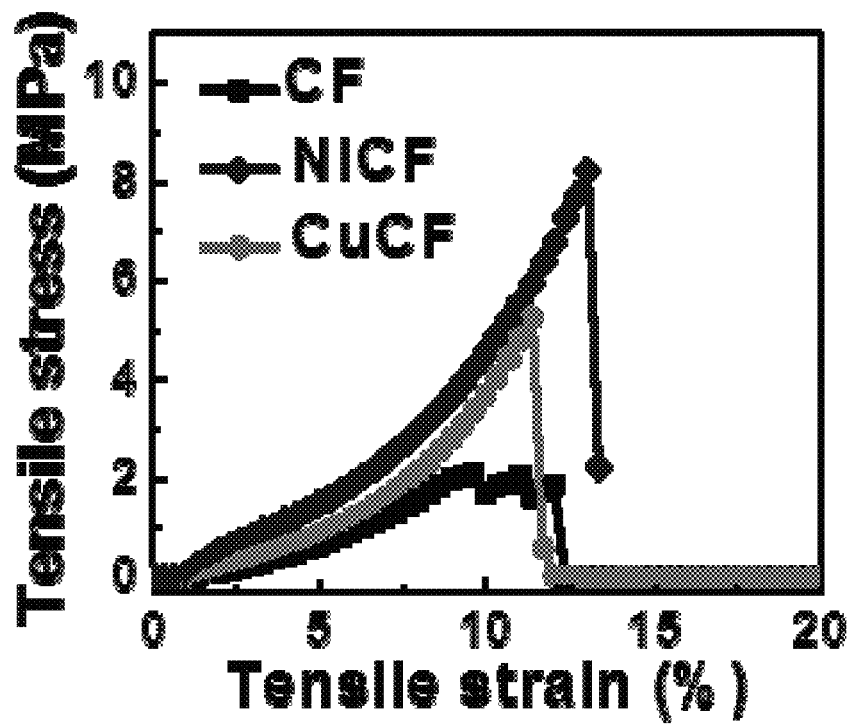
FIG. 11A shows tensile stress-strain curves of CF, CuCF, and NiCF.
Figure 11B:
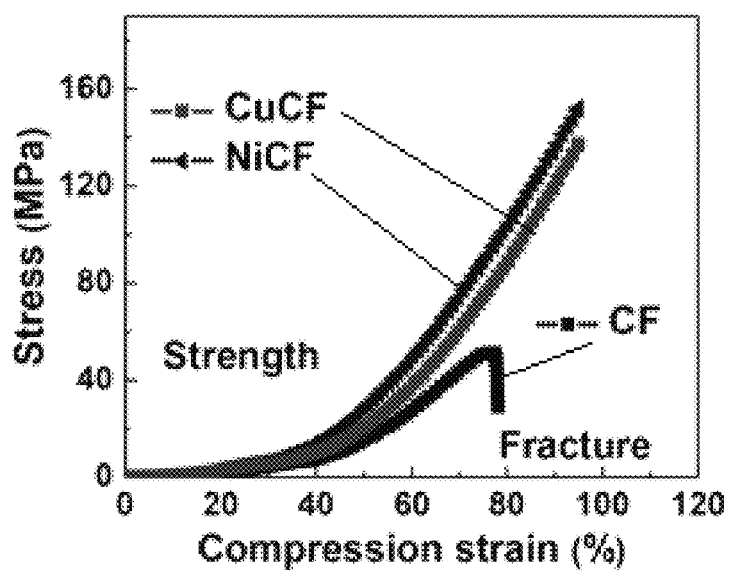
FIG. 11B shows compression stress-strain curves of CF, CuCF, and NiCF.
Figure 11C:
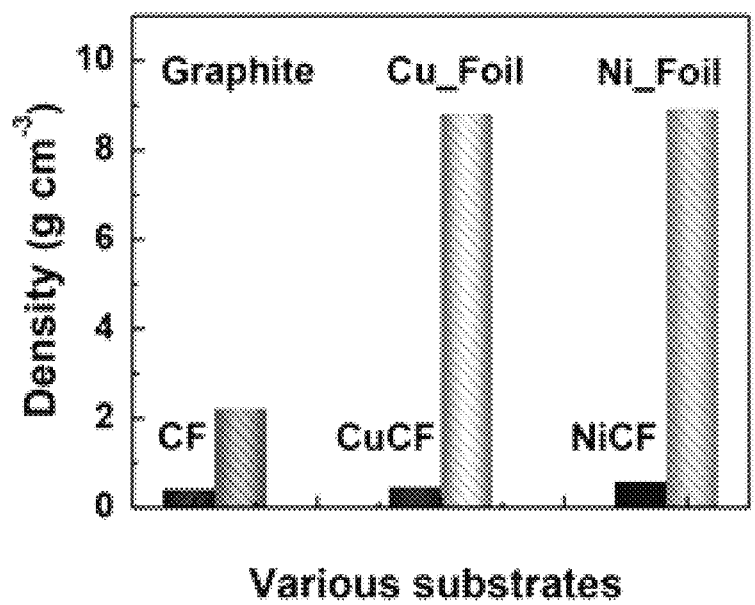
FIG. 11C shows packing densities of graphite foil, copper foil, nickel foil, CF, CuCF and NiCF.

FIG. 11A shows tensile stress-strain curves of CF, CuCF, and NiCF. FIG. 11B shows compression stress-strain curves of CF, CuCF, and NiCF. FIG. 11C shows packing densities of graphite foil, copper foil, nickel foil, CF, CuCF and NiCF. As shown in the figures, these metallic fabrics exhibit much higher tensile and compression strength than that of CFs without obvious density increases, which is in accordance with the wear-resistant and lightweight requirements of wearable condition. The remarkable properties can be ascribed, at least in part, to the uniform polymer interfacial layer (PMETAC) that bonds the metal with the surface of CFs.

Subsequent to the metal deposition, a certain amount of Li metal was electrochemically plated on CuCF to yield the Li/CuCF anode. A slurry mixture containing nitrogen and sulfur co-doped graphene (NSCG), a carbon black, and Ss was coated on NiCF to yield the NSCG/Ss/NiCF cathode as shown in FIG. 7. Finally, the two pieces of fabric electrodes, together with a commercial separator membrane and ether-based electrolyte, were assembled into a soft full cell and sealed in an aluminium encapsulation.

Plating and Stripping Behavior of Li/CuCF Anode

The CuCF possesses an ultrahigh ability to stabilize Li metal during its electroplating and stripping process. The nucleation behavior of Li metal is firstly analyzed during the $1^{st}$ electroplating process, in which the nucleation overpotential of Li is defined as the difference between the sharp tip voltage and the later stable mass-transfer overpotential.

Figure 12:
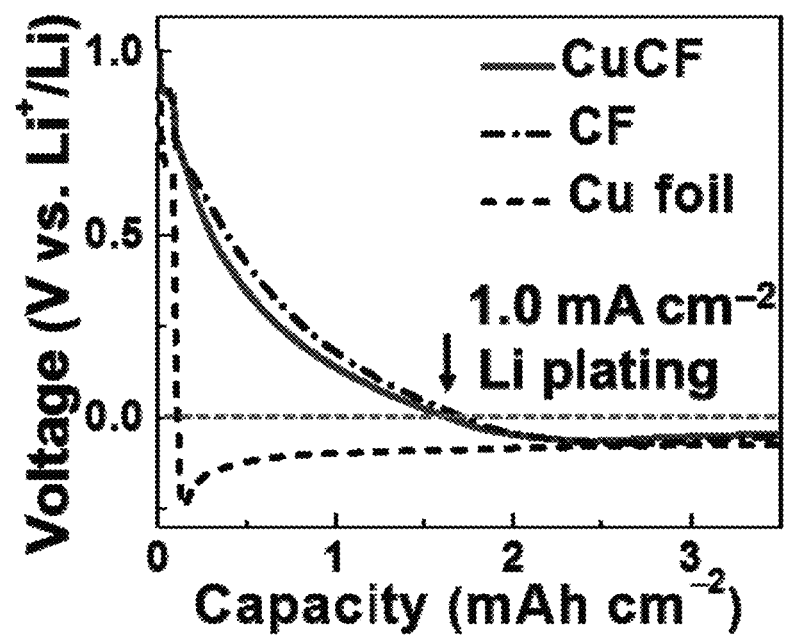
FIG. 12 shows the nucleation behavior of Li metal onto various hosts (CuCF, CF, and Cu foil) at 1.0 mA cm$^{-2}$ during the 1$^{st}$ electroplating process.

FIG. 12 shows the nucleation behavior of Li metal onto various hosts (CuCF, CF, and Cu foil) at 1.0 mA cm$^{-2}$ during the $1^{st}$ electroplating process. When plating Li onto bare Cu foil, large nucleation overpotential of 170 mV is observed, which indicates the unfavorable interaction between Cu foil and Li metal. In contrast, the nucleation overpotential of Li metal on CuCF is only 15 mV.

Figure 13:
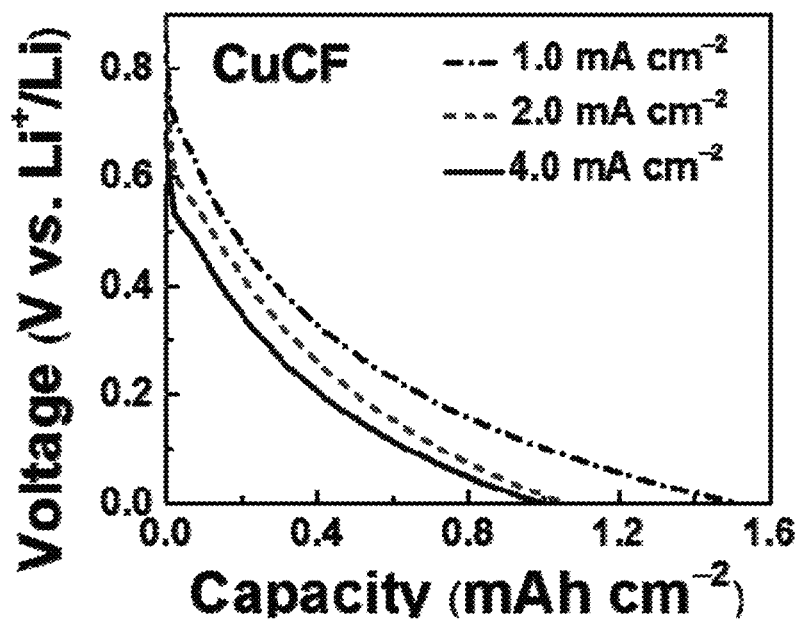
FIG. 13 shows a partial lithiation for CuCF regulated with changing current densities during electrodeposition.
Figures 14A, 14B, 14C, 14D:
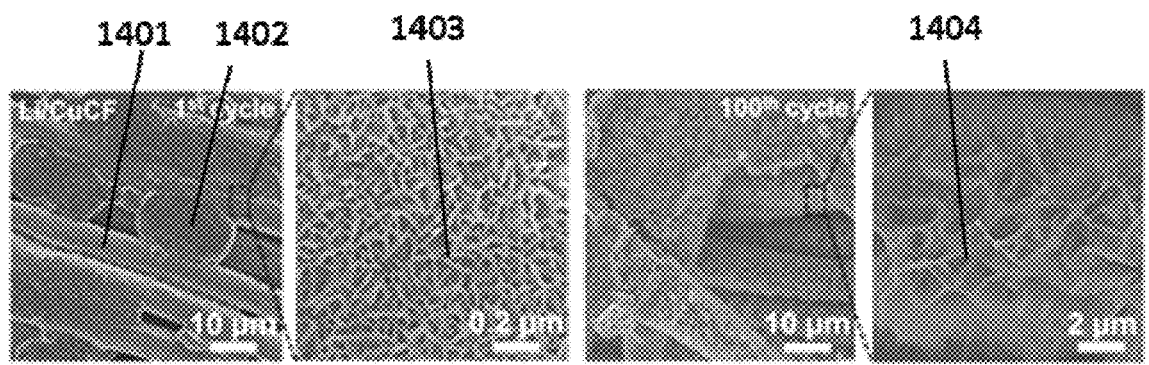
FIG. 14A shows a low magnification SEM images of Li/CuCF anode after the 1$^{st}$ plating/striping cycle at 1.0 mA cm$^{-2}$.
FIG. 14B shows a high magnification SEM images of Li/CuCF anode after the 1$^{st}$ plating/striping cycle at 1.0 mA cm$^{-2}$.
FIG. 14C shows a low magnification SEM images of Li/CuCF anode after the 100$^{st}$ plating/striping cycle at 1.0 mA cm$^{-2}$.
FIG. 14D shows a high magnification SEM images of Li/CuCF anode after the 100$^{st}$ plating/striping cycle at 1.0 mA cm$^{-2}$.

FIG. 13 shows a partial lithiation for CuCF regulated with changing current densities during electrodeposition. The electrodeposition on CuCF exhibits a two-step process: an initial Li$^+$ intercalation into CuCF from 0.75 V (vs. Li/Li$^+$) and a subsequent Li metal deposition on the Cu surface at nearly 0 V. The initial Li$^+$ intercalation step is believed to form LiC$_x$ complex with the carbon fibers, which turns CuCF into a highly lithiophilic substrate for the subsequent Li deposition. In addition, as shown in FIGS. 14A and 14B, the Cu nanoparticles, which fully cover the surface of CuCF 1401, may also serve as nucleation centers to further enhance the affinity to Li metal. Uniform spherical particles 1402 and partial ultrathin nanosheets 1403 of metallic Li are observed on the CuCF 1401 after the electroplating.

Apart from the ultralow nucleation overpotential at the $1^{st}$ electroplating process, Li/CuCF also maintains a significantly low mass-transfer overpotential in a long-term repeating striping/plating of Li metal. Here, coin cells made of one pair of Li/CuCF anodes (electrode capacity: 6.0 mAh cm$^{-2}$) are stripped and plated in a partial capacity of 2.0 mAh cm$^{-2}$ at a current density of 1.0 mA cm$^{-2}$. The Cu nanoparticles on the surface of CuCF can also confine the deposits of metallic Li and allow the continuous formation of Li flakes 1404 on CuCF 1401 during the striping/plating process as shown in FIGS. 14C and 14D. The spherical particles of Li metal formed at the $1^{st}$ electroplating process gradually transform into uniform Li flakes. The Li flakes significantly reduce the mass-transfer overpotential of Li metal by allowing much faster Li$^+$ transport and Li metal deposition, which lead to steadily low overpotential.

Figure 15A:
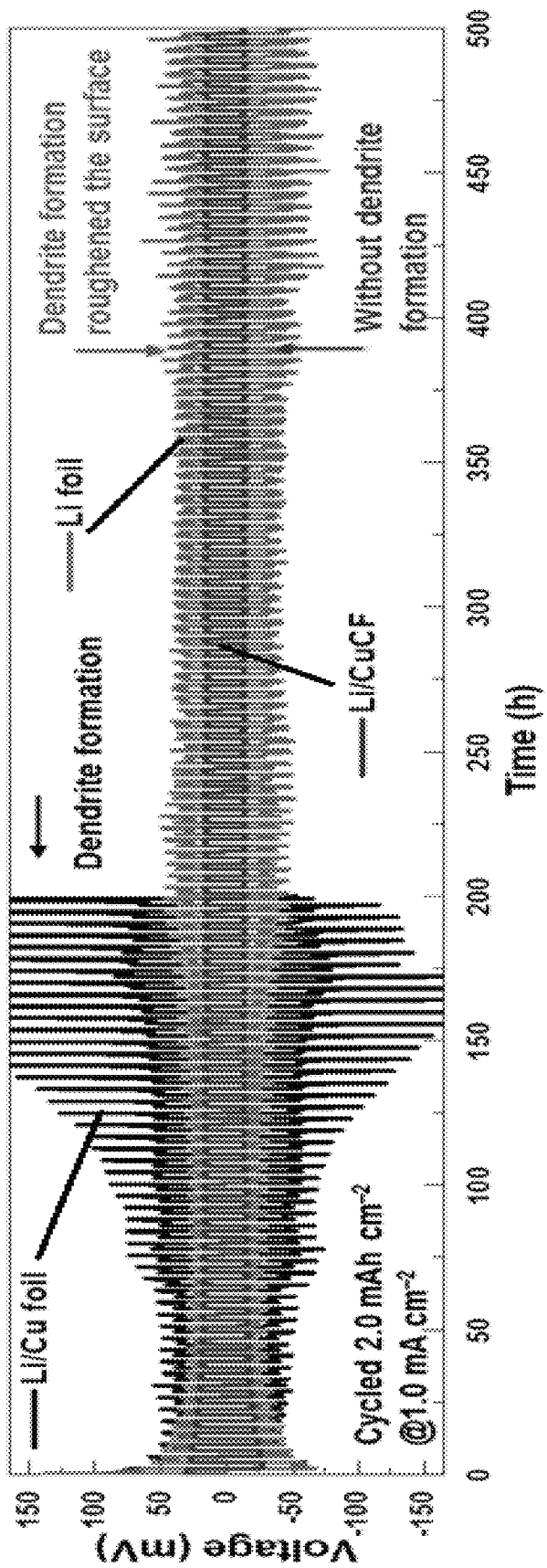
FIG. 15A shows galvanostatic plating/stripping profiles in Li/Cu foil, Li foil and Li/CuCF symmetric cells at 1.0 mA cm$^{-2}$.
Figure 15B:
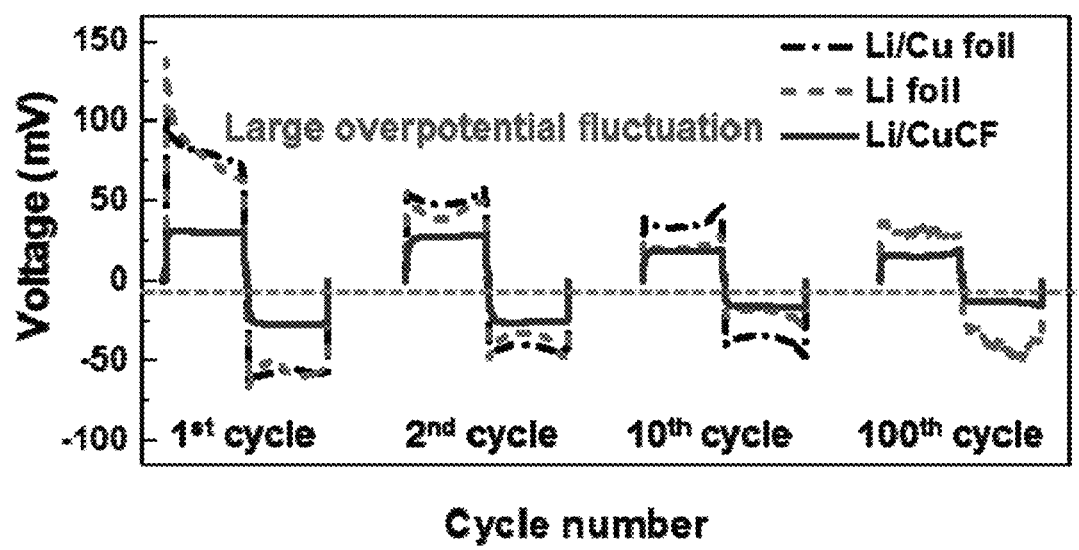
FIG. 15B shows galvanostatic plating/stripping profile of various Li anodes at 1$^{st}$, 2$^{nd}$, 10$^{th}$, and 100$^{th}$ cycle.
Figure 16A:
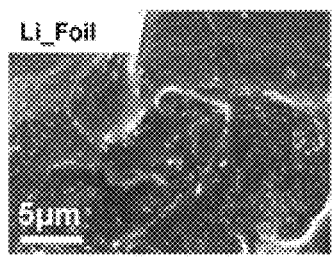
FIG. 16A shows a SEM image of bare Li foil at the 1$^{st}$ cycle.
Figure 16B:
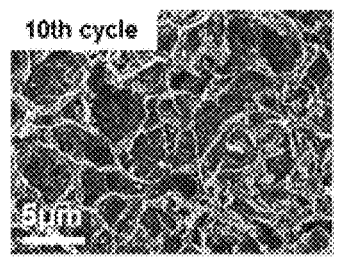
FIG. 16B shows a SEM image of bare Li foil after the 10$^{th}$ cycle.
Figure 16C:
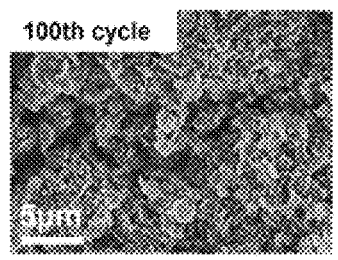
FIG. 16C shows a SEM image of bare Li foil after the 100 cycle.
Figure 16D:
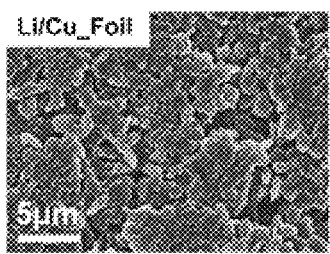
FIG. 16D shows a SEM image of bare Cu foil at the 1$^{st}$ cycle.
Figure 16E:
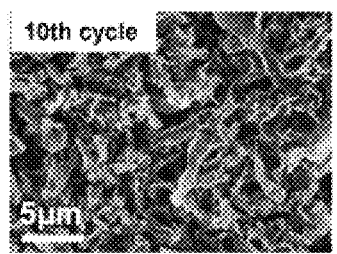
FIG. 16E shows a SEM image of bare Cu foil after the 10$^{th}$ cycle.
Figure 16F:
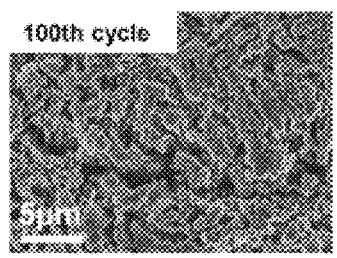
FIG. 16F shows a SEM image of bare Cu foil after the 100 cycle.

FIG. 15A shows galvanostatic plating/stripping profiles in Li/Cu foil, Li foil and Li/CuCF symmetric cells at 1.0 mA cm$^{-2}$, and FIG. 15B shows galvanostatic plating/stripping profile of various Li anodes at $1^{st}$, $2^{nd}$, $10^{th}$, $100^{th}$ cycle. As shown in FIGS. 15A and 15B, the overpotential of Li/CuCF symmetric cell starts at a very low value of ~30 mV. It continues to decrease until reaching ~20 mV at the $10^{th}$ cycle and keeps constant for 120 cycles. In comparison, when one pair of pure Li foils or Li on Cu foils (Li/Cu foil) are assembled into symmetric coin cells, obvious dendrite formation is observed as shown in FIGS. 16A-16F (The amount of Li cycled is 2.0 mAh cm$^{-2}$ at a current density of 1.0 mAcm$^{-2}$ in all cases). The fragment and delamination of Li foil after cycling adversely increase the overpotential and simultaneously speed up the Li loss. For Li/Cu foil, the uncontrolled mossy deposits of Li metal lead to the violent fluctuation of overpotential at the $15^{th}$ cycle and the sudden jump at the $35^{th}$ cycle.

Figure 17:
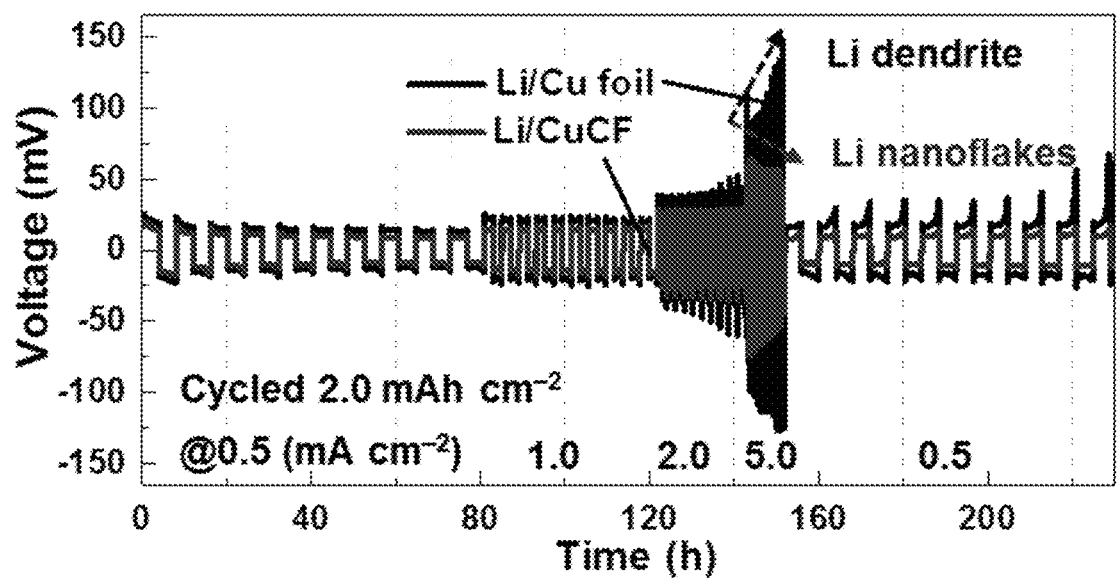
FIG. 17 shows a rate performance comparison between Li/CuCF and Li/Cu foil at various current densities from 0.5 to 5.0 mA cm$^{-2}$.

FIG. 17 shows a rate performance comparison between Li/CuCF and Li/Cu foil at various current densities from 0.5 to 5.0 mA cm$^{-2}$. The areal capacity of Li metal anodes is 6.0 mAh cm$^{-2}$ in all cases. The ability to stabilize Li metal with CuCF becomes even more prominent when the striping/plating process is carried out at high rate. For example, when the current density is increased to a very high rate of 5.0 mAcm$^{-2}$, Li/CuCF still shows a successively reduced overpotential at the early stage and keeps a very low value of ~50 mV. The Li/Cu foil, however, results in drastically increased overpotential over 150 mV just after 10 cycles.

Coulombic Efficiency and Cycling Stability Li/CuCF Anode

For Li metal anodes, a primary challenge is to reduce the Li loss during the cycling, i.e., to achieve a high CE to ensure a long cycle life. The cycled Li loss primarily originates from two unstable interfaces: i) SEI layers which repeatedly break and repair due to the dendrite formation; ii) the interfacial side reaction between Li and the substrate surface which repeatedly occurs during cycling.

Figure 18:
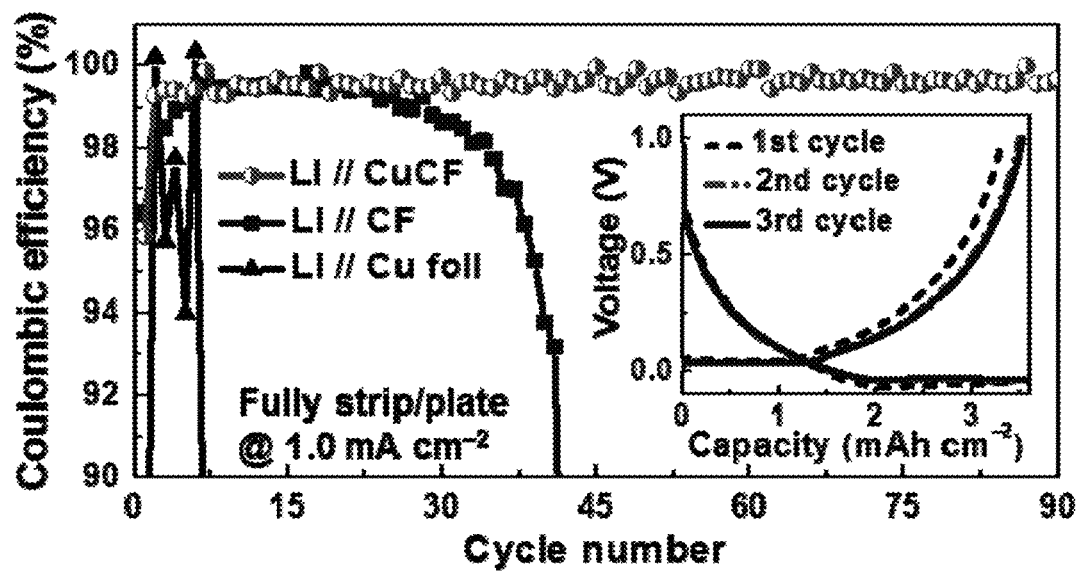
FIG. 18 shows the CEs of various Li anodes including Li/CuCF, Li/CF and Li/Cu foil during cycling against Li foil, where 3.5 mAh cm$^{-2}$ of Li is fully plated and stripped at 1.0 mA cm$^{-2}$, and the profiles of areal capacity versus voltage for Li/CuCF anode are recorded in the inset.

A high CE of the Li/CuCF anode is found due to the high stability of Li on Li/CuCF and a low operation overpotential. The CEs of various Li anodes including Li/CuCF, Li/CF and Li/Cu foil during the electrochemical cycling against Li foil, where 3.5 mAh cm$^{-2}$ of Li is fully plated and stripped at a current density of 1.0 mA cm$^{-2}$ are shown in FIG. 18. For Li/Cu foil, the CE rapidly drops to below 90% after only 6 cycles, resulting from the dendrite formation and SEI damage. Compared to Li/Cu foil, Li/CF exhibits a higher average CE of 98.2% during the first 40 cycles, indicating that the three-dimensional fabric structure with high surface area can reduce the effective current density and stabilize the SEI layer. Li/CF suffers from a cycling deterioration after the $40^{th}$ cycle, which is attributed to the Li-ether co-intercalation and subsequent structural damage. Li/CuCF shows a much higher average CE of 99.54% and much longer cycling stability than that of CF and Cu foil. As shown above, the Cu coating can effectively prevent side reaction between Li and CF surface.

Figure 19:
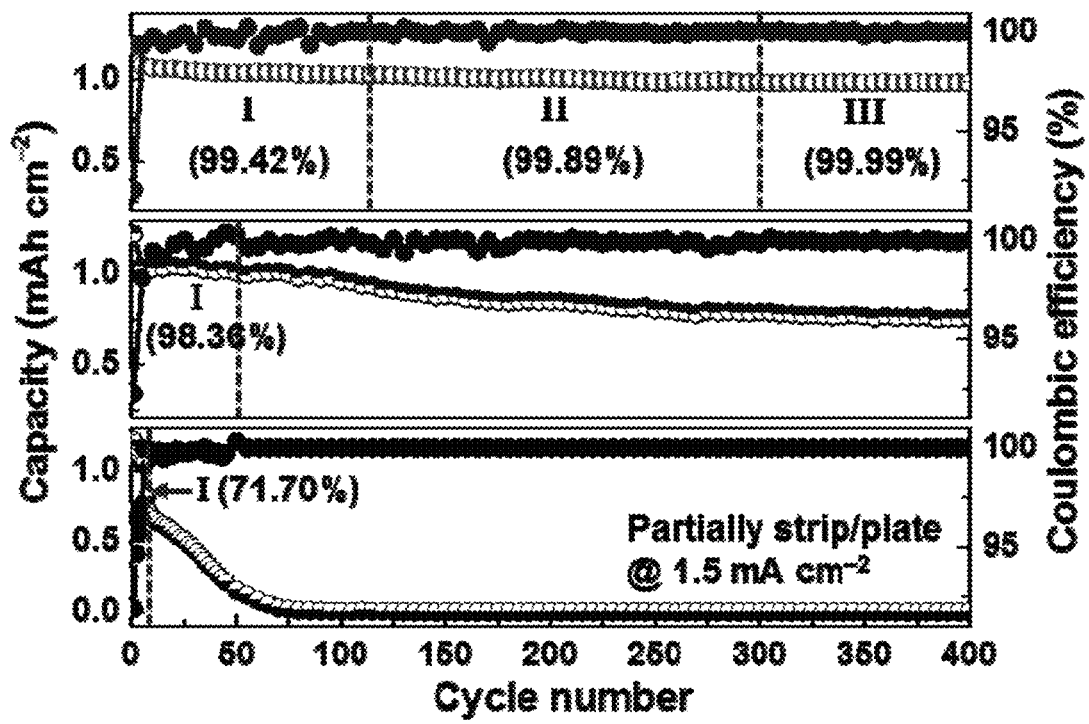
FIG. 19 shows the areal capacities and corresponding CEs of Li/CuCF, Li/CF, and Li/Cu foil anode-LTO cells for 400 cycles are plotted at a current density of 1.5 mA cm$^{-2}$ from top to bottom respectively.
Figure 20A:
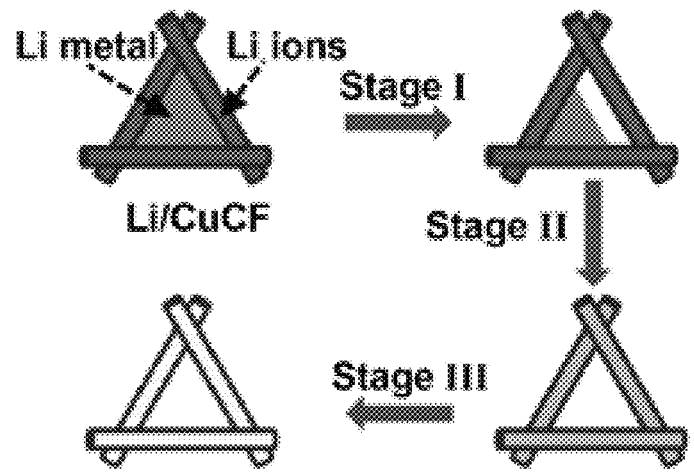
FIG. 20A shows a scheme of three cycling Stages (I, II, and III) for Li/CuCF anode.
Figure 20B:
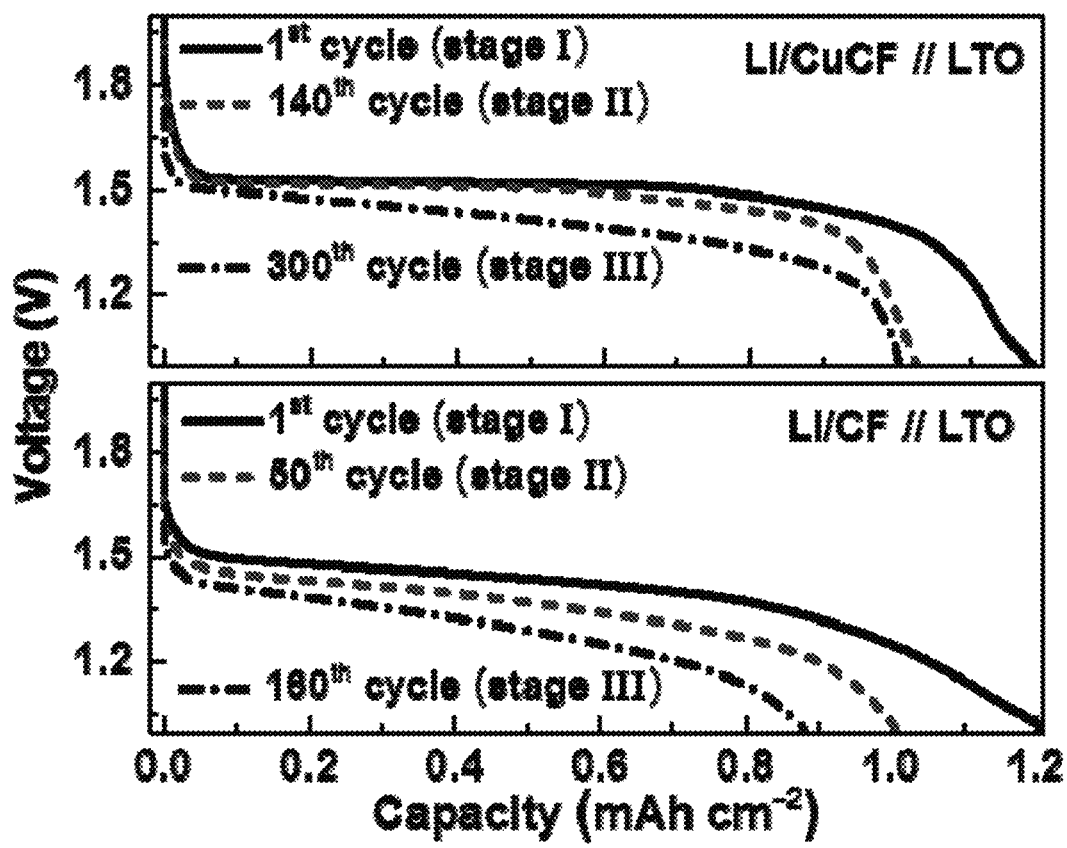
FIG. 20B shows galvanostatic discharge profiles of Li/CuCF-LTO and Li/CF-LTO cells at 1.5 mA cm$^{-2}$ for various cycling stages.

FIG. 19 shows the areal capacities and corresponding CEs of Li/CuCF, Li/CF, and Li/Cu foil anode-LTO cells for 400 cycles plotted at a current density of 1.5 mA cm$^{-2}$ from top to bottom respectively. The cycling process involves in three stages: Stage I represents the cycling process only occurs to the plated Li metal; Stage II represents the cycling process, which occurs to both the plated Li metal and the inserted Li$^+$; Stage III represents the cycling process and only occurs to the inserted Li$^+$. To evaluate the CE and investigate the storage mechanism of Li metal anodes, a LTO counter electrode (1.0 mAh cm$^{-2}$) is paired with an oversized Li/CuCF anode (3.5 mAh cm$^{-2}$) as shown in FIG. 19. The total capacity of the Li/CuCF anode includes the plated Li metal capacity of 2.0 mAh cm$^{-2}$ and the intercalated Li$^+$ capacity of 1.5 mAh cm$^{-2}$. The use of the LTO counter electrode ensures that all the cycled Li loss originates from Li/CuCF anode, because LTO has no prestored Li. It is observed that there is a large Li loss of 0.18 mAh cm$^{-2}$ due to the formation of SEI in the $1^{st}$ cycle as shown in FIG. 19. From the $2^{nd}$ cycle, the capacity of the cell decayed slowly until the $140^{th}$ cycle. FIG. 20A shows a scheme of three cycling Stages (I, II, and III) for Li/CuCF anode. FIG. 20B shows galvanostatic discharge profiles of Li/CuCF-LTO and Li/CF-LTO cells at 1.5 mA cm$^{-2}$ for various cycling stages. The areal capacity of Li metal anodes is 3.5 mAh cm$^{-2}$ in all cases. When the capacity of Li metal is in excess to that of LTO, the striping process only occurs to the plated Li metal as shown in FIGS. 20A and 20B. This process is defined as Stage I. The average CE of Li metal in Stage I is calculated to be 99.42% in Li/CuCF anode. In Stage II, starting from the $141^{th}$ cycle, the striping process occurs to both the Li metal and the intercalated Li$^+$ due to the lower capacity of Li metal than that of LTO. In Stage III, starting from the $300^{th}$ cycle, the capacity of the cell becomes very stable and no obvious drop is observed. The CE of Stage III is 99.99%, which is attributed to the highly reversible Li$^+$ insertion/desertion of the CuCF. Therefore, the capacity depletion in Stage II can be ascribed to the loss of Li metal, and the average CE of Li metal is determined to be 99.89% in Li/CuCF anode. Following the same testing conditions, the reference cell made of Li/CF//LTO shows a much shorter Stage I until only $50^{th}$ cycle as shown in FIG. 20B, which corresponds to a low CE of 98.36%. The reference cell made of Li/Cu foil//LTO with similar capacity loading decayed even much more rapidly and loses all the capacity at the $70^{th}$ cycle, which corresponds to a very poor CE of 71.7%. Again, the results indicate that the three-dimensional metallic CF current collector can not only reduce the effective current density and stabilize the SEI layer, but also prevent the side reaction between Li and CF surface.

Electrochemical Properties of NSCG/S$_8$/NiCF Cathode

Figure 21A:
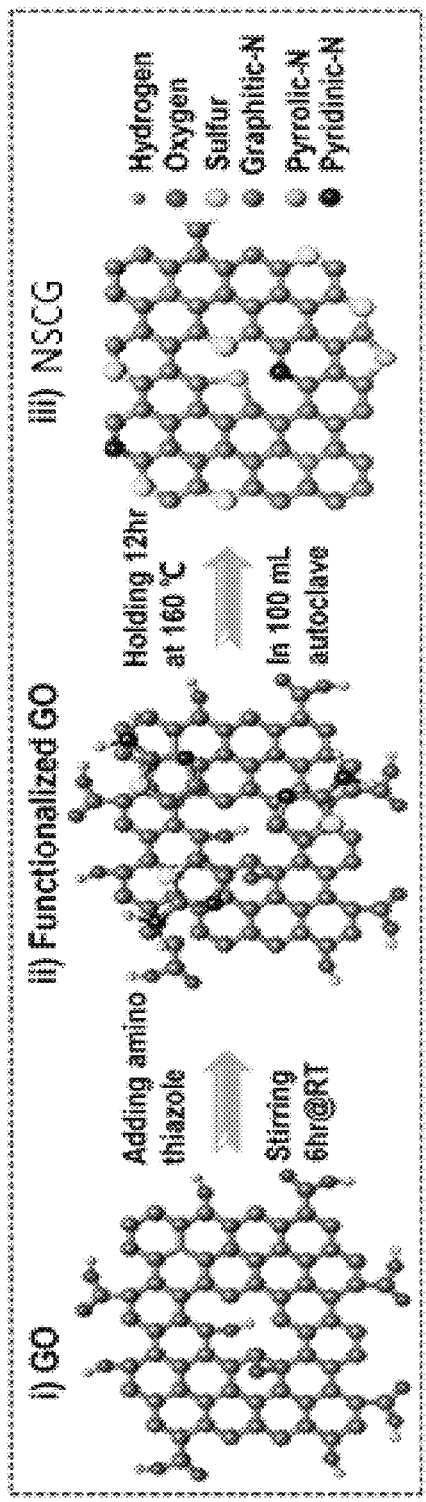
FIG. 21A shows a schematic illustration of synthesizing NSCG by a facile hydrothermal method according to certain embodiments.
Figure 21B:
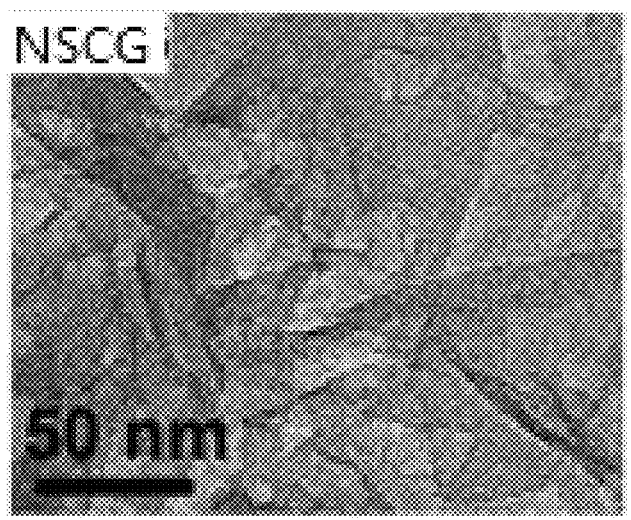
FIG. 21B shows a high-magnification TEM image of NSCG with porous structures.
Figure 21C:
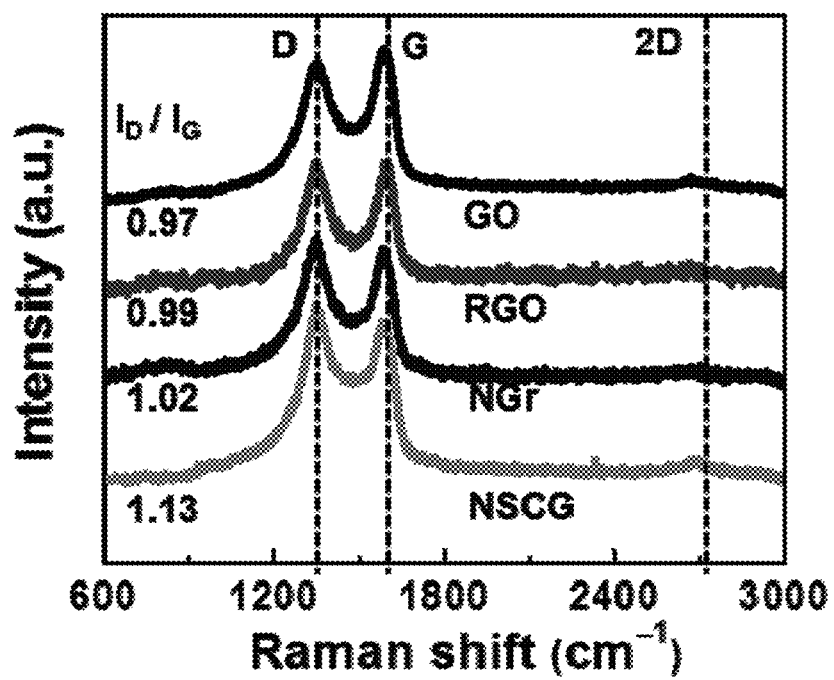
FIG. 21C shows a Raman spectroscopy of GO, RGO, NGr, and NSCG.
Figure 21D:
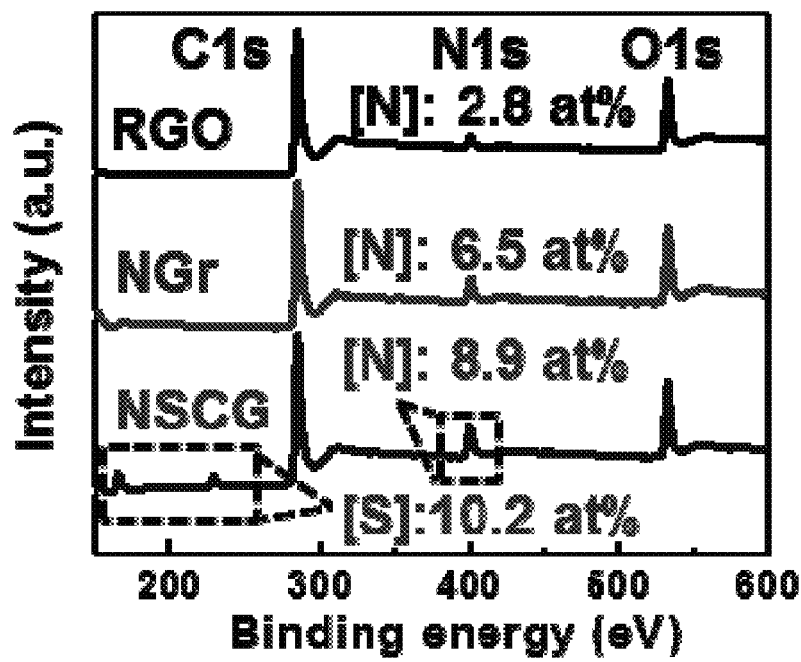
FIG. 21D shows X-ray photon spectroscopy (XPS) survey spectra of RGO, NGr and NSCG.
Figure 21E:
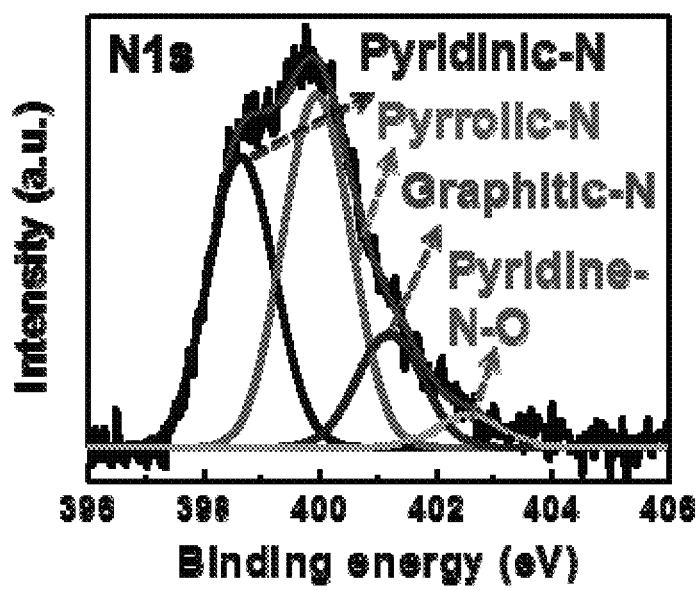
FIG. 21E shows a high-resolution $N_{1s}$ XPS core spectrum of NSCG.
Figure 21F:
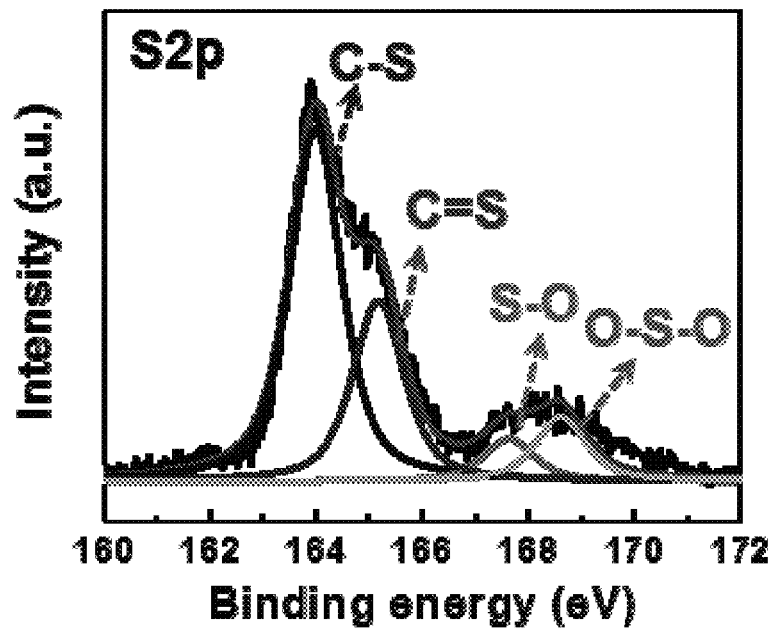
FIG. 21F shows a high-resolution $S_{2p}$ XPS core spectra of NSCG.
Figure 21G:
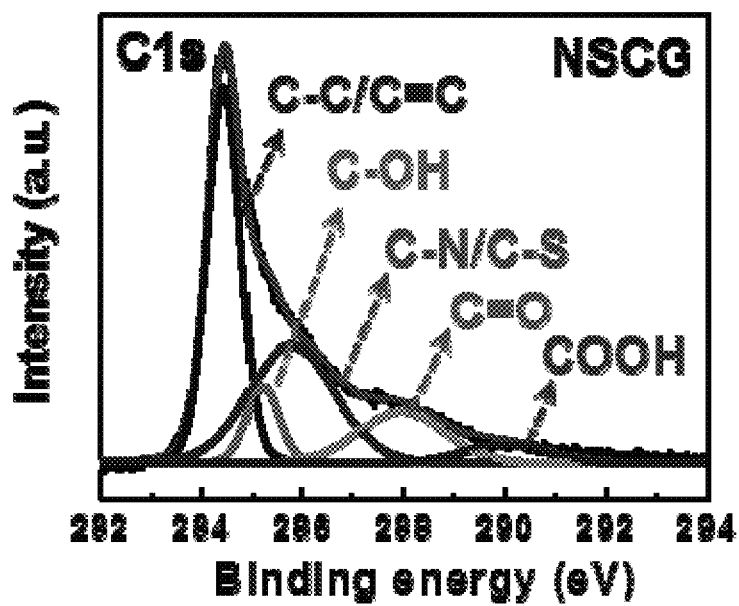
FIG. 21G shows a high-resolution $C_{1s}$ XPS core spectrum of NSCG.
Figure 21H:
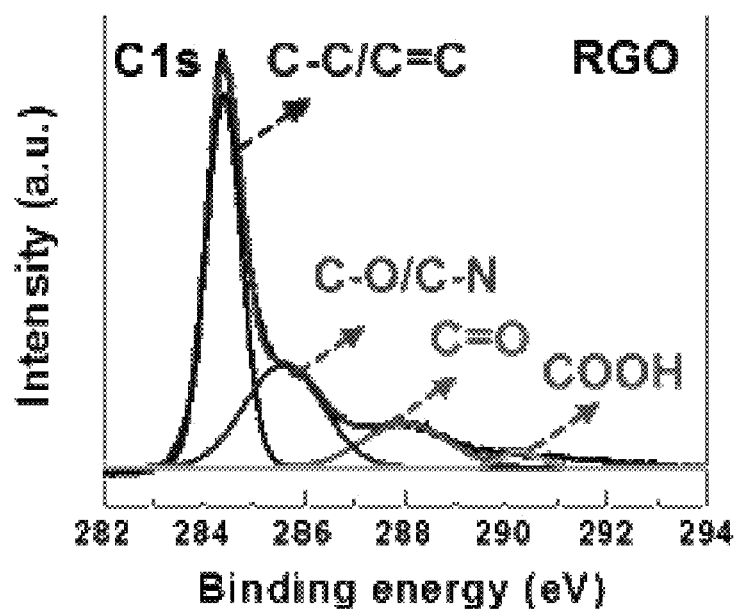
FIG. 21H shows a high-resolution $C_{1s}$ XPS core spectrum of RGO.
Figure 21I:
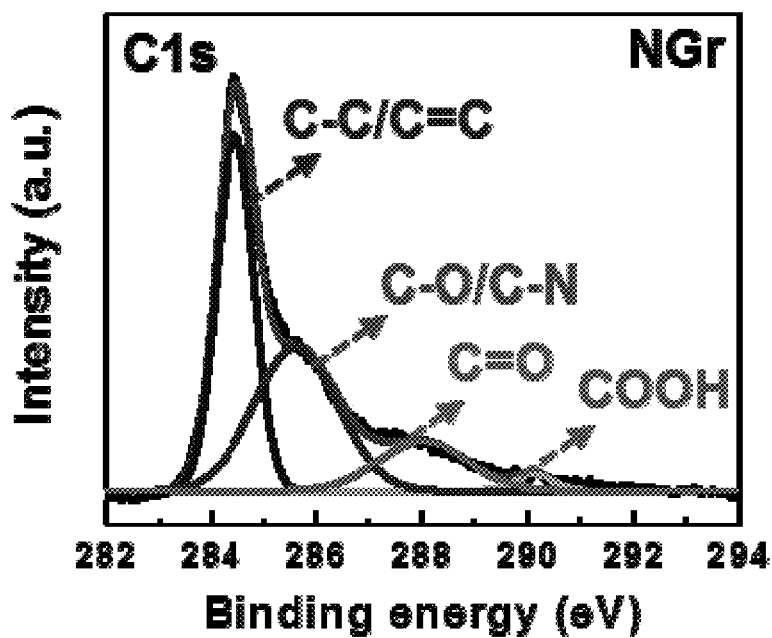
FIG. 21I shows a high-resolution $C_{1s}$ XPS core spectrum of NGr.

The as-prepared NiCF was immersed into a pre-mixed slurry containing 70 wt % S$_8$, 17.5 wt % carbon black, and 12.5 wt % NSCG and then dried in a vacuum oven. The NSCG was synthesized through a modified procedure as shown in FIG. 21A. FIG. 21B shows a high-magnification TEM image of NSCG with porous structures. FIG. 21C shows a Raman spectroscopy of GO, RGO, NGr, and NSCG. The high intensity ratio of D to G band (1.13) of NSCG suggests the doping of nitrogen and sulfur into graphene. FIG. 21D shows X-ray photon spectroscopy (XPS) survey spectra of RGO, NGr and NSCG. FIGS. 21E and 21F show high-resolution N$_{1s}$ and S$_{2p}$ XPS core spectra of NSCG. FIGS. 21G-21I shows high-resolution C$_{1s}$ XPS core spectra of NSCG, RGO, and NGr. Here, high-resolution N1s XPS spectra of NSCG indicate the existence of pyridinic N (398.7 eV), pyrrolic N (400.1 eV), and graphitic N (401.2 eV) structures. Moreover, the deconvoluted spectra of S2p suggests the binding states of sulfur are C—S—C (163.9 eV), C=S (165.2 eV), S—O (167.6 eV) and O—S—O (168.6 eV). High-resolution C1s XPS spectra of NSCG reveals small amount of oxygen-containing functional groups at 285.2 (C—OH), 288 (C=O), and 290 (O=C—O) are retained.

Figures 22A, 22B, 22C, 22D:
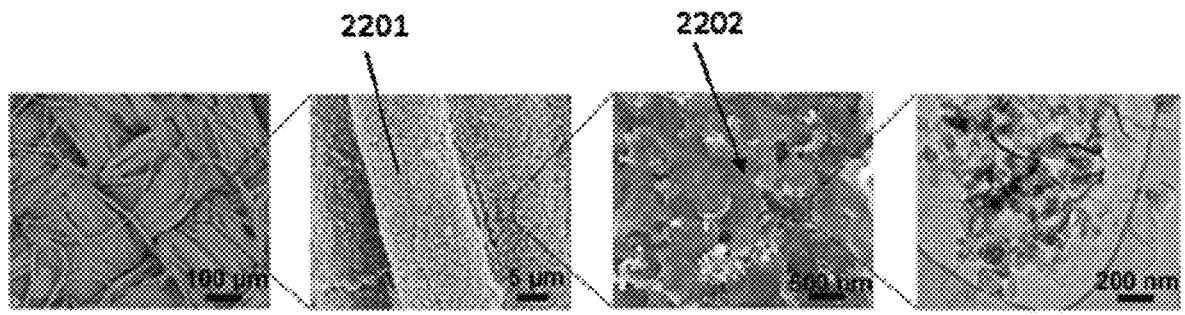
FIG. 22A shows a low magnification SEM image of the NSCG/$S_8$/Ni cathode.
FIG. 22B shows a middle magnification SEM image of the NSCG/$S_8$/Ni cathode.
FIG. 22C shows a high magnification SEM image of the NSCG/$S_8$/Ni cathode.
FIG. 22D shows transmission electron microscopy (TEM) images of NSCG/$S_8$ cladding layers, extracted from NSCG/$S_8$/Ni cathode.
Figure 23A:
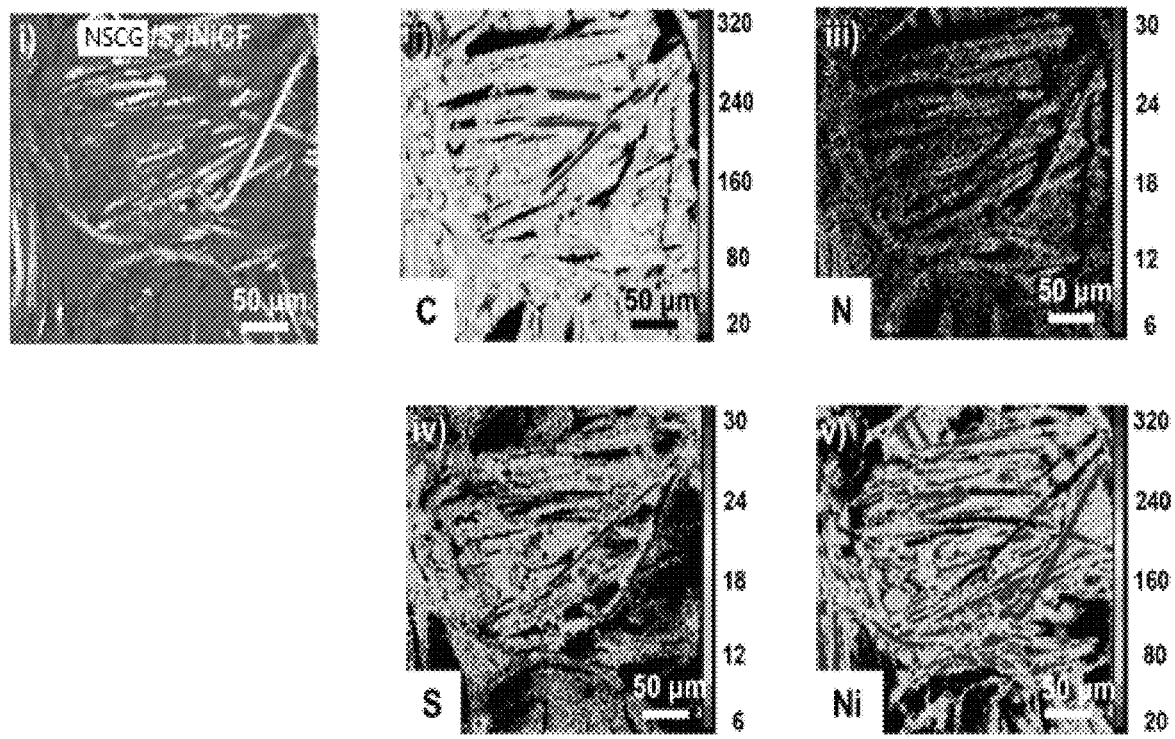
FIG. 23A shows elemental (C, N, S, and Ni) distribution mapping and their corresponding quantitative composition in the composite cathode (NSCG/$S_8$/NiCF) detected by electron probe micro-analyzer (EPMA)
Figure 23B:
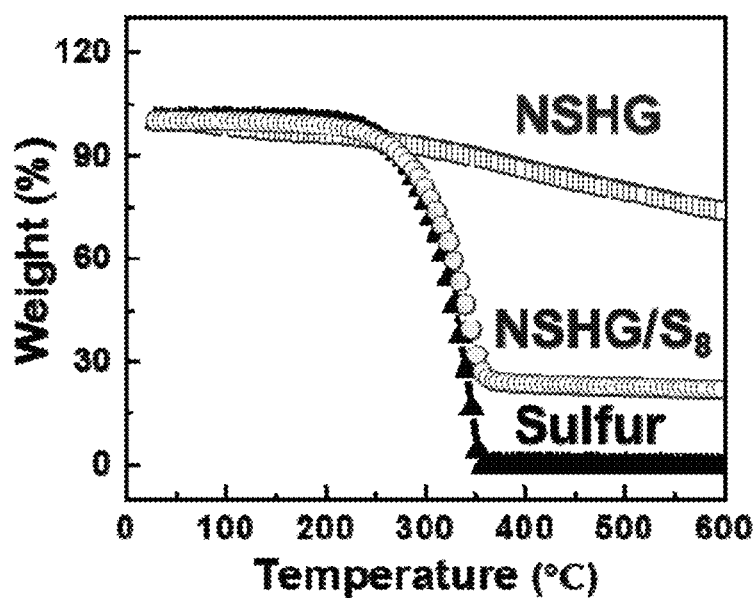
FIG. 23B shows thermalgravimetric analysis (TGA) of sulfur, NSCG, and NSCG/$S_8$ (containing carbon black)

FIGS. 22A-22C show low, medium and high magnification SEM images of the NSCG/S$_8$/Ni cathode. The sulfur cathode was obtained by direct infiltration of NSCG/S$_8$ hybrid inks into the NiCF, followed by drying at 60° C. in a vacuum chamber. FIG. 22D shows a transmission electron microscopy (TEM) image of NSCG/S$_8$ cladding layers, extracted from NSCG/S$_8$/Ni cathode. From the SEM and transmission electron microscopy (TEM) characterizations as shown in FIGS. 22A-22D, surfaces of a Ni-coated fiber 2201 are uniformly and densely wrapped with the well-mixed NSCG/carbon black/Ss nanocomposites 2202 after the coating process. FIG. 23A shows elemental (C, N, S, and Ni) distribution mapping and their corresponding quantitative composition in the composite cathode (NSCG/S$_8$/NiCF) precisely detected by electron probe micro-analyzer (EPMA). FIG. 23B shows thermalgravimetric analysis (TGA) of sulfur, NSCG, and NSCG/S$_8$ (containing carbon black). From the electron probe micro-analyzer (EPMA) and thermogravimetric analysis (TGA) as shown in FIGS. 23A and 23B, the precise content of S$_8$ is determined to be 75 wt % in the nanocomposite coating. The highly polar NSCG serves as a conductive binder to strongly immobilize sulfur onto the surface of each metallized fiber. The carbon black addition mainly contributes to the prevention of NSCG restacking.

Figure 24:
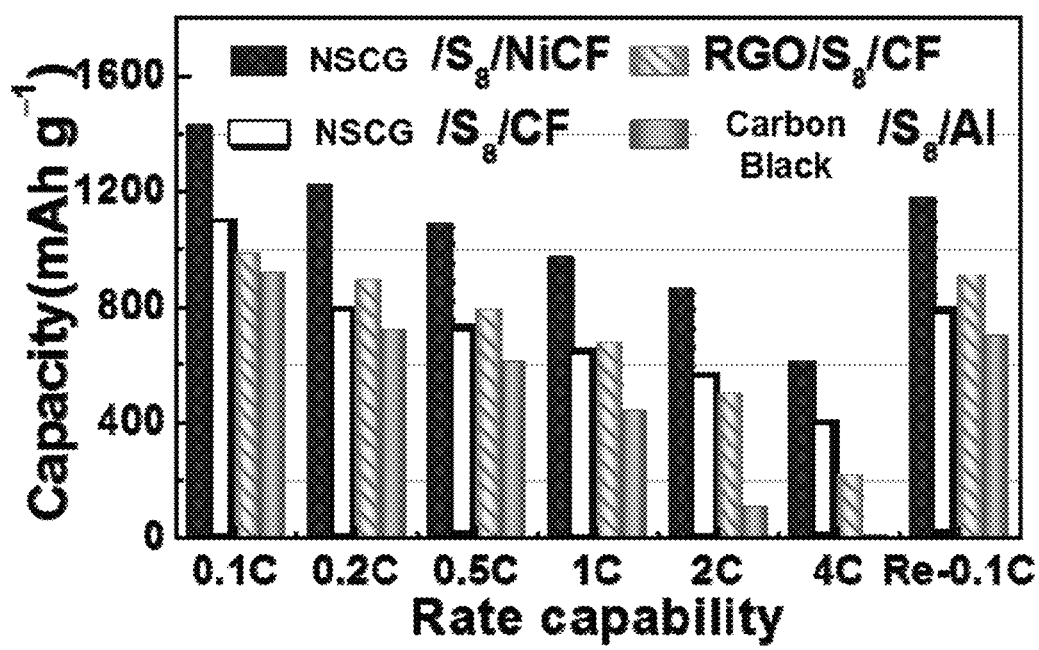
FIG. 24 shows specific capacities at various rates for sulfur cathodes, including NSCG/$S_8$/NiCF, NSCG/$S_8$/CF, RGO/$S_8$/NiCF and carbon black/$S_8$/Al electrodes.
Figure 25A:
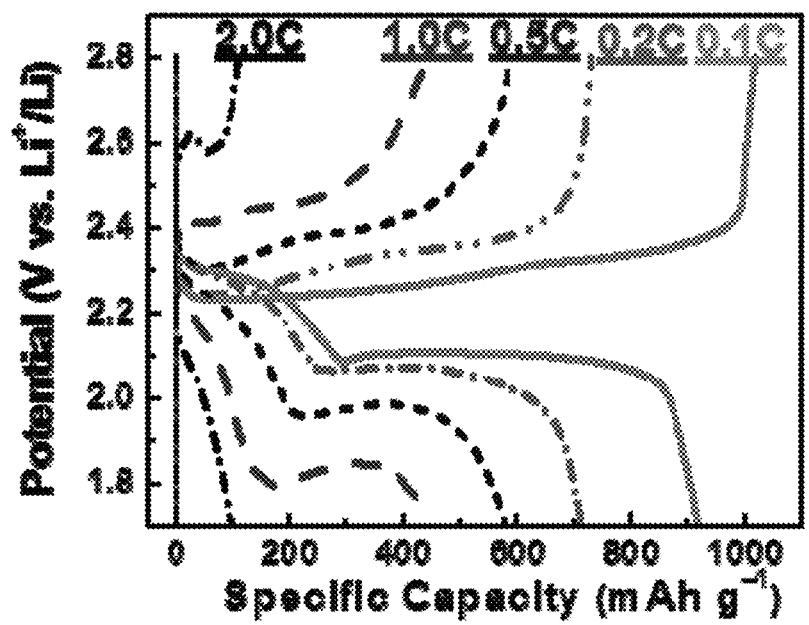
FIG. 25A shows galvanostatic charge-discharge profiles at various rates (1 C=1675 mA $g^{-1}$ of sulfur) of carbon black/$S_8$/Al foil in half-cell.
Figure 25B:
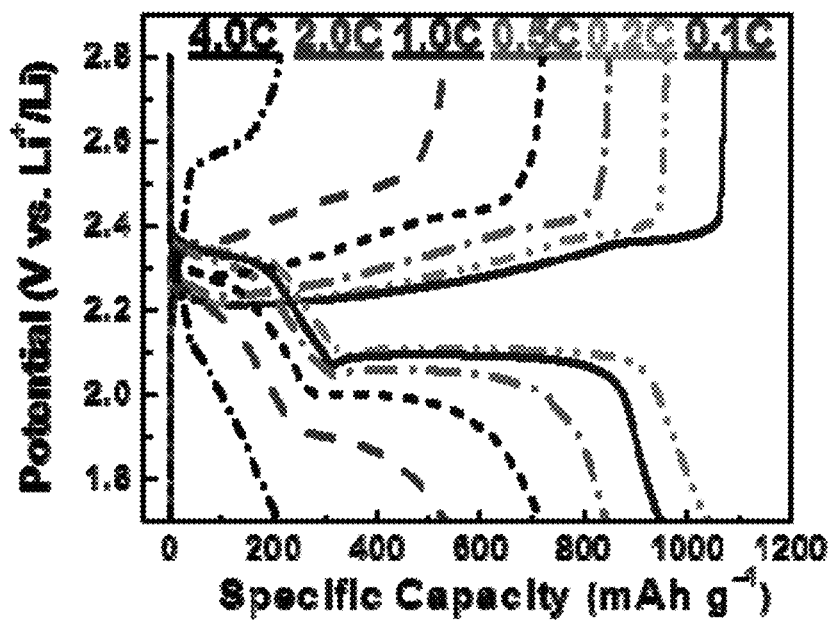
FIG. 25B shows galvanostatic charge-discharge profiles at various rates (1 C=1675 mA $g^{-1}$ of sulfur) of RGO/$S_8$/CF in half-cell.
Figure 25C:
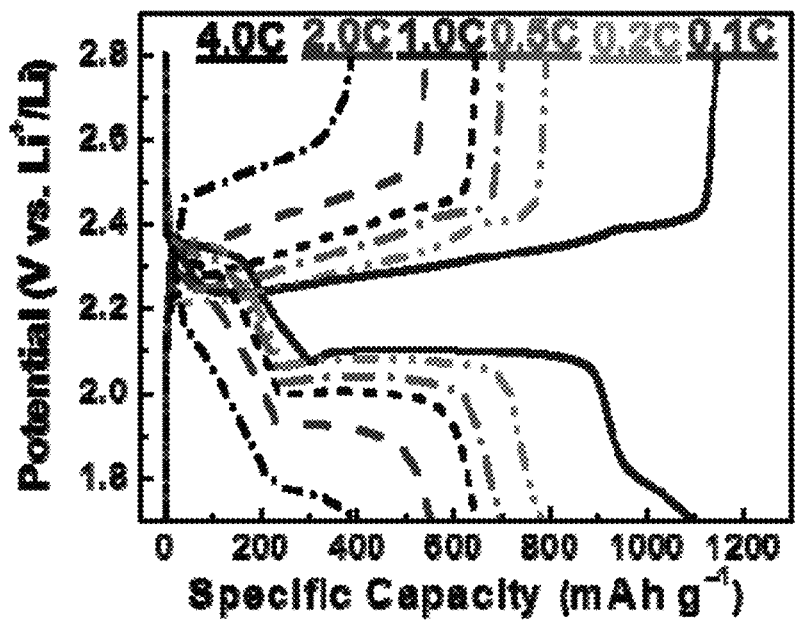
FIG. 25C shows galvanostatic charge-discharge profiles at various rates (1 C=1675 mA $g^{-1}$ of sulfur) of NSCG/$S_8$/CF in half-cell.
Figure 25D:
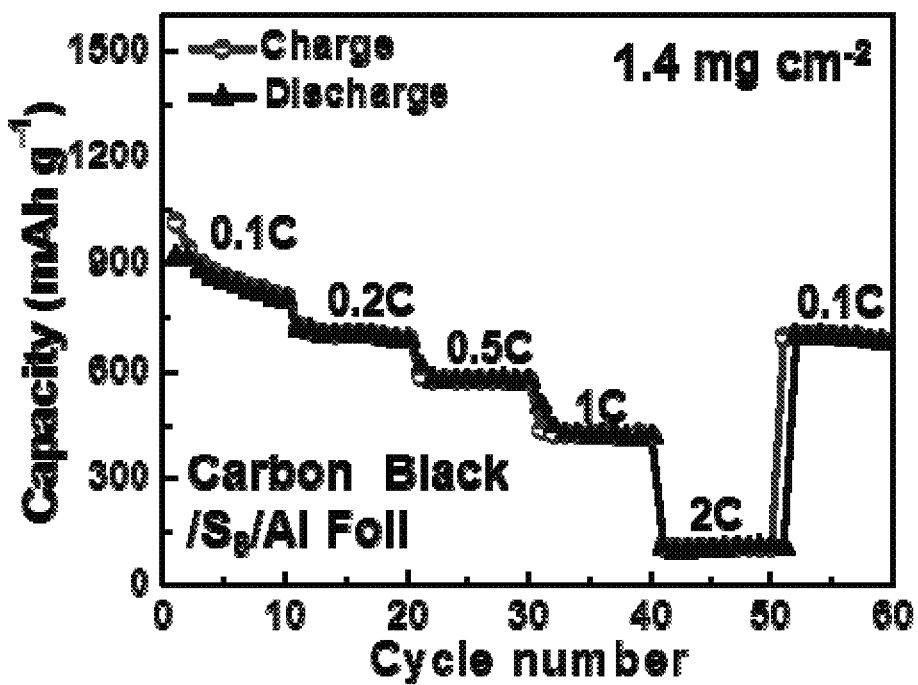
FIG. 25D shows the corresponding capacities at various rates of carbon black/$S_8$/Al foil in half-cell.
Figure 25E:
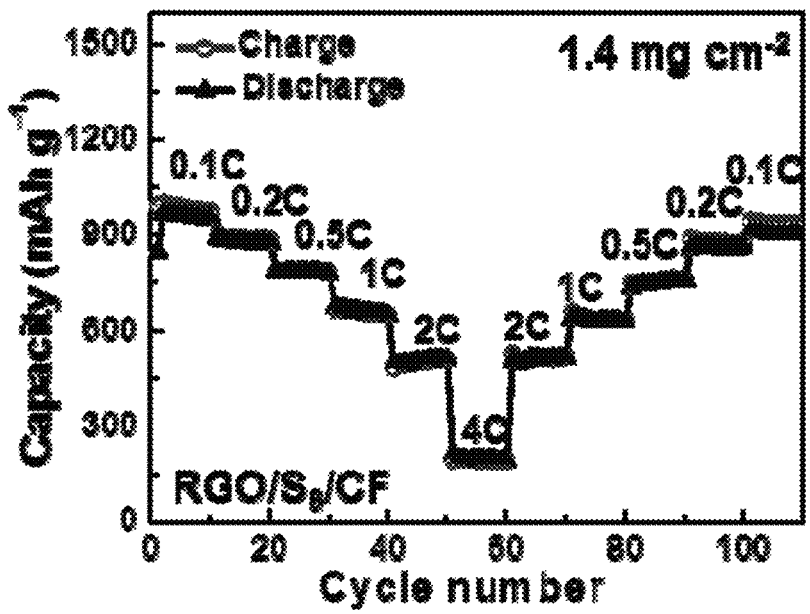
FIG. 25E shows the corresponding capacities at various rates of RGO/$S_8$/CF in half-cell.
Figure 25F:
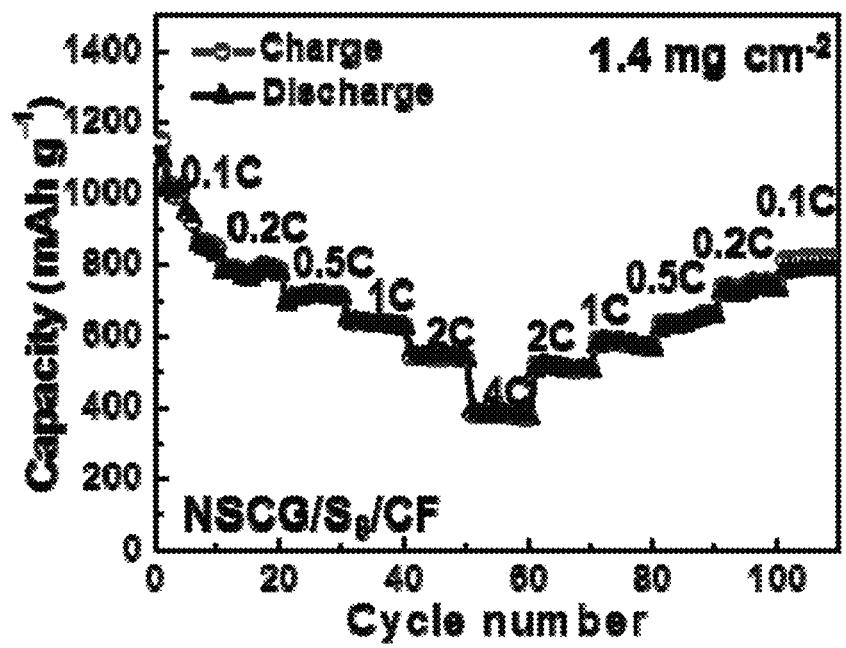
FIG. 25F shows the corresponding capacities at various rates of NSCG/$S_8$/CF in half-cell.
Figure 25G:
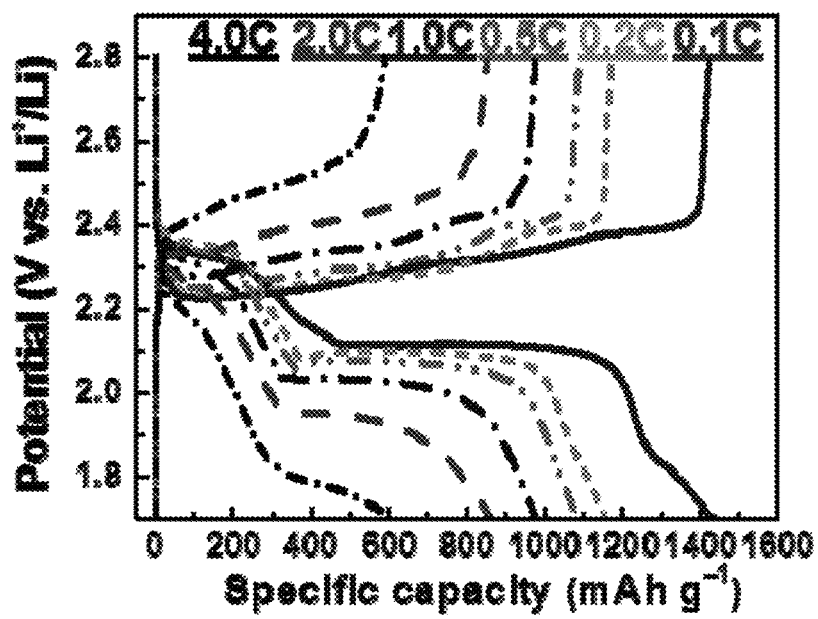
FIG. 25G shows galvanostatic charge-discharge profiles at various rates (1 C=1675 mA $g^{-1}$ of sulfur) of NSCG/$S_8$/NiCF in half-cell.
Figure 25H:
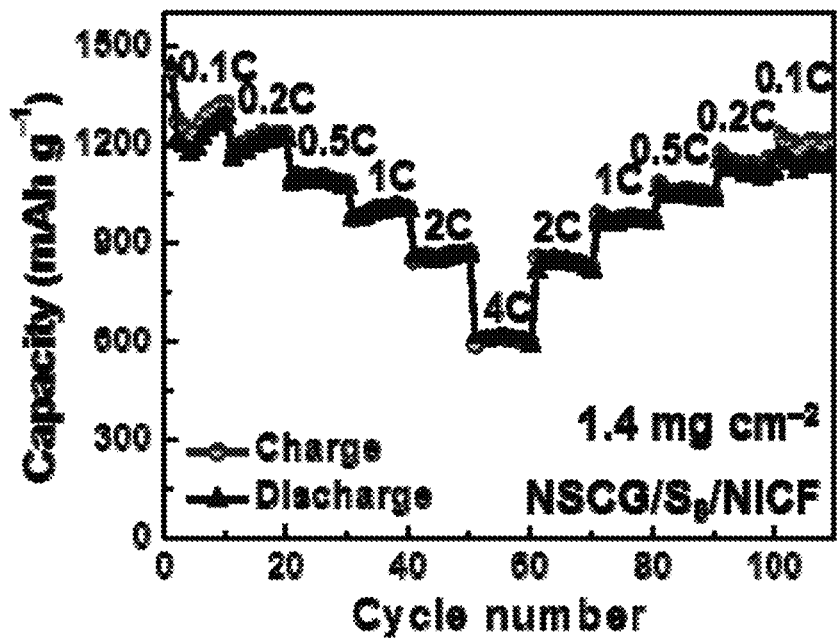
FIG. 25H shows the corresponding capacities at various rates of NSCG/$S_8$/NiCF in half-cell.
Figure 25I:
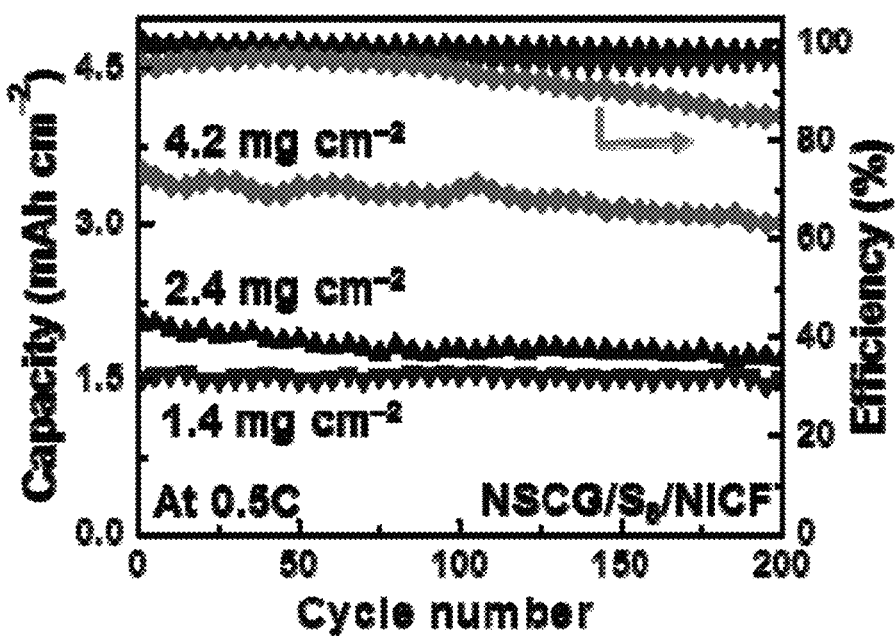
FIG. 25I shows the cycling performance and corresponding CEs of NSCG/$S_8$/NiCF plotted with different sulfur loadings at 0.5 C.
Figure 26:
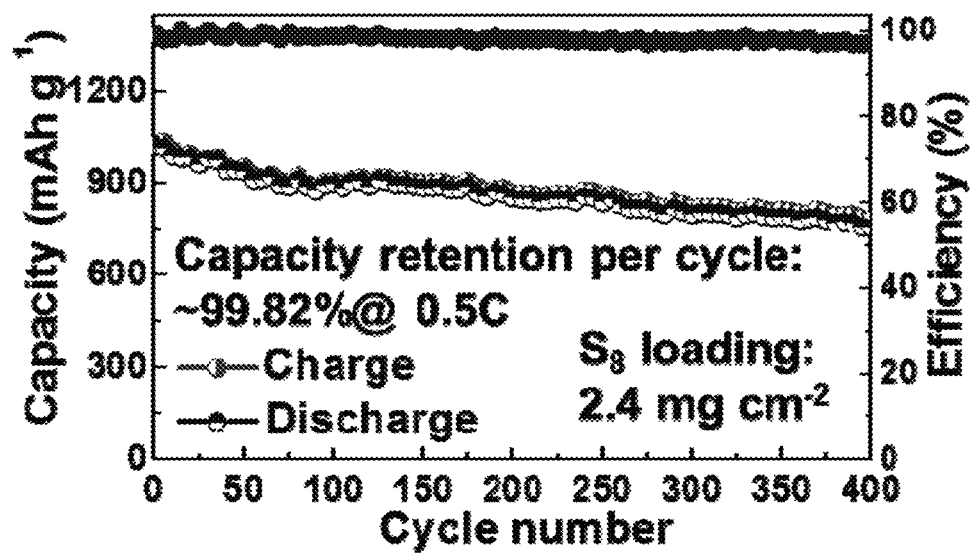
FIG. 26 shows specific capacities, and corresponding CEs of the optimized NSCG/$S_8$/NiCF cathode obtained at 2.0 mA $cm^{-2}$ for 400 cycles.

FIG. 24 shows specific capacities at various rates for sulfur cathodes, including NSCG/S$_8$/NiCF, NSCG/S$_8$/CF, RGO/S$_8$/NiCF and carbon black/S$_8$/Al electrodes. The NSCG/S$_8$/NiCF cathode (vs. Li foil) exhibits high capacities at a wide range of discharging rates ranging from 0.1 C to 4 C (1 C=2.3 mA cm$^{-2}$). For example, the initial capacity at 0.1 C, 0.5 C, and 4 C reach 1427 mAh g$^{-1}$, 1016 mAh g$^{-1}$ and 614 mAh g$^{-1}$ respectively. FIGS. 25A-25H show galvanostatic charge-discharge profiles and corresponding capacities at various rates (1 C=1675 mA g$^{-1}$ of sulfur) of carbon black/S$_8$/Al foil, RGO/S$_8$/CF, NSCG/S$_8$/CF, and NSCG/S$_8$/NiCF in half-cell. FIG. 25I shows the cycling performance and corresponding CEs of NSCG/S$_8$/NiCF plotted with different sulfur loadings at 0.5 C. The capacities at all rates are much superior to reference samples made with NSCG/S$_8$/CF, RGO/S$_8$/CF and carbon black/S$_8$/Al cathodes as shown in FIG. 24 and FIGS. 25A-25I. FIG. 26 shows specific capacities, and corresponding CEs of the optimized NSCG/S$_8$/NiCF cathode obtained at 2.0 mA cm$^{-2}$ for 400 cycles. The capacity retention per cycle of NSCG/S$_8$/NiCF reaches 99.82% over 400 cycles with a high mass loading of 2.4 mg cm$^{-2}$. This sulfur mass loading can easily be tuned by changing the pre-mixed slurry concentration or the infiltration time. For example, a stable areal capacity of 3.51 mAh cm$^{-2}$ is obtained at a sulfur mass loading of 4.2 mg cm$^{-2}$ as shown in FIG. 25I.

Figure 27A:
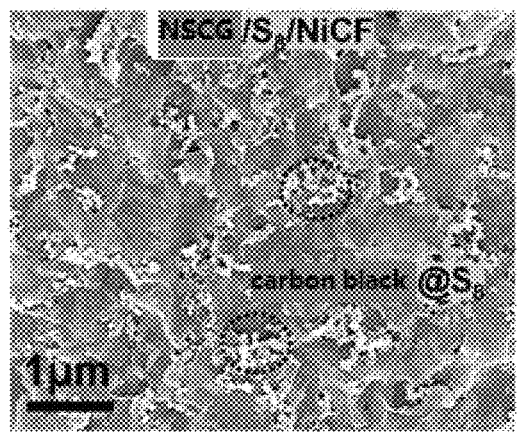
FIG. 27A shows a SEM image of NSCG/$S_8$/NiCF.
Figure 27B:
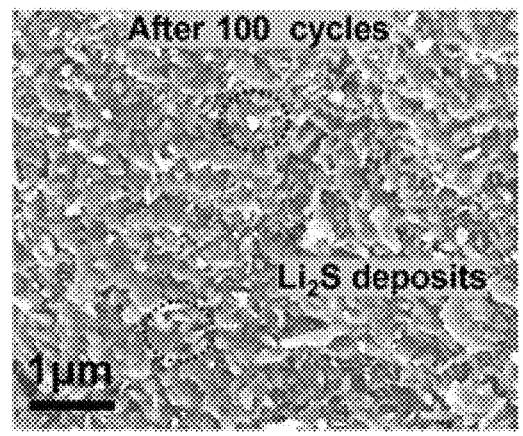
FIG. 27B shows a SEM image of NSCG/$S_8$/NiCF after 100 charge/discharge cycles at 0.5 C (1 C=1675 mAh $g^{-1}$)

The excellent rate capability, cycling stability, and high areal capacities of NSCG/S$_8$/NiCF cathode can be ascribed to three main factors as follows. 1) The incorporation of high-surface-area CF can improve the accessibility of electrolytes to the electrodes, e.g., RGO/S$_8$/CF electrodes exhibit much better capacities compared to carbon black/S$_8$/Al at all rates as shown in FIG. 24. 2) The addition of NSCG not only serves as excellent binders to immobilize solid sulfur onto the metallic fabric, but also takes advantage of the hetero-atoms (N and S) doping sites to chemically absorb soluble polysulfides. That is, NSCG/Ss/CF electrodes further enhance the capacities at high rates compared to RGO/S$_8$/CF. 3) Most importantly, the Ni coating supported with high-surface-area CF effectively catalyze the reduction/oxidation of soluble polysulfides and the absorption/decomposition of the Li$_2$S end-product to improve the utilization of sulfur/Li$_2$S. The rapid growth of uniform sulfur/Li$_2$S nanoparticles within conducting NSCG matrix onto NiCF illustrates the catalytical role of Ni-metallic layers as shown in FIGS. 27A and 27B. After cycling, it is observed that NiCF supports the uniform agglomerates of Li$_2$S nanoparticles within NSCG layers, which indicates the rapid growth of Li$_2$S deposits by heterogeneous nucleation onto the surface of NiCF. The strong structure can endow excellent mechanical and electrochemical performances.

Figure 28:
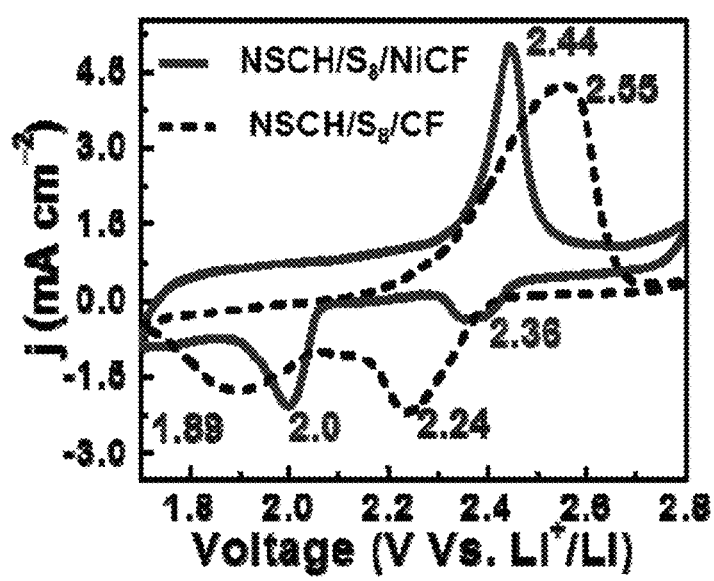
FIG. 28 shows cyclic voltammetry curves of NSCG/$S_8$/NiCF and NSCG/$S_8$/CF at a scan rate of 0.2 mV $s^{-1}$ in a potential window from 1.7 to 2.8 V.
Figure 29A:
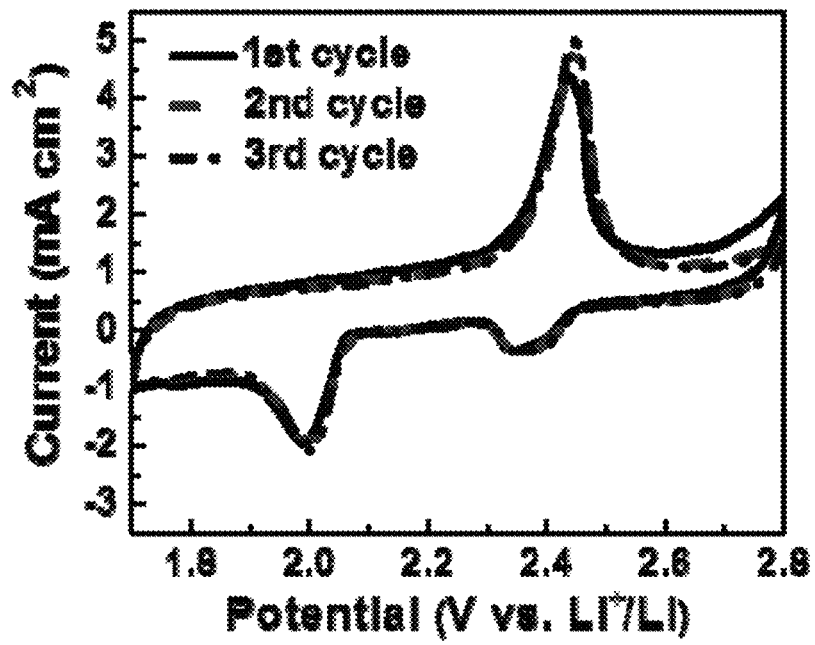
FIG. 29A shows a cyclic voltammetry curves of a NSCG/$S_8$/NiCF electrode within a potential window of 1.7-2.8 V at a scan rate of 0.2 mV $s^{-1}$.
Figure 29B:
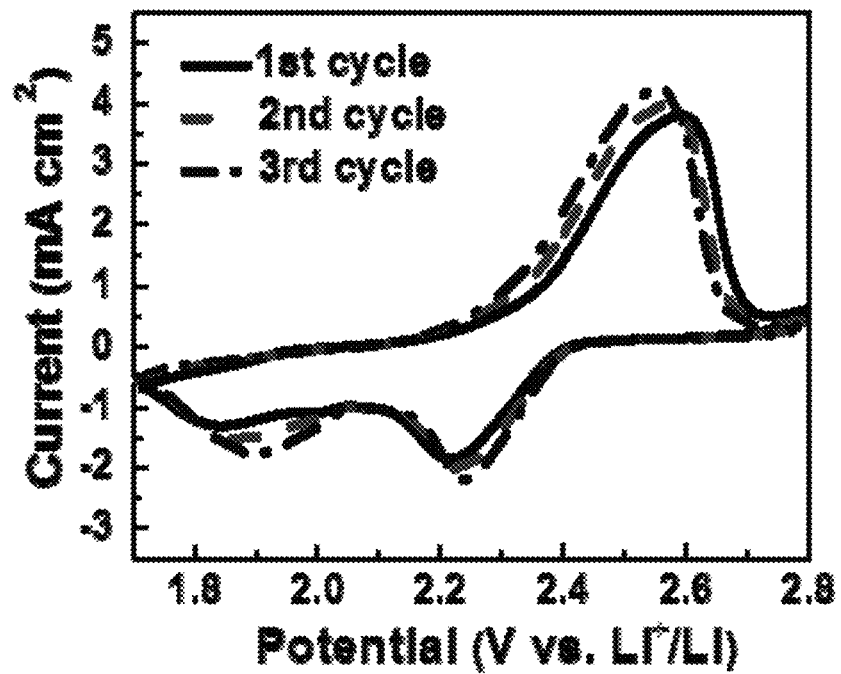
FIG. 29B shows a cyclic voltammetry curves of a NSCG/$S_8$/CF electrode within a potential window of 1.7-2.8 V at a scan rate of 0.2 mV $s^{-1}$.
Figure 29C:
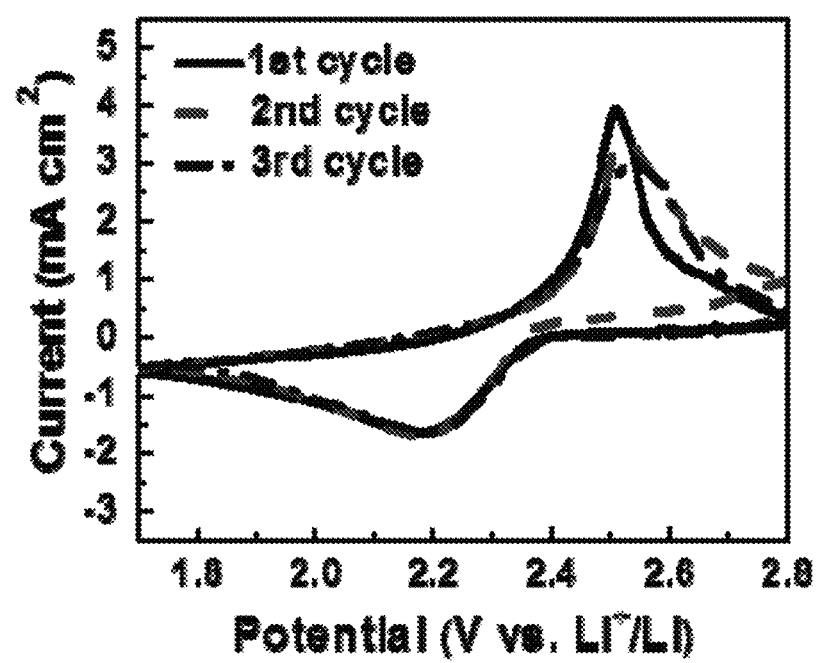
FIG. 29C shows a cyclic voltammetry curves of a carbon black/$S_8$/Al electrode within a potential window of 1.7-2.8 V at a scan rate of 0.2 mV $s^{-1}$.

To further prove the catalytic property of Ni surface, the electrochemical activity of the electrodes by cyclic voltammetry (CV) was tested at a potential window of 1.7-2.8 V and a scan rate of 0.2 mV s$^{-1}$. Both NSCG/S$_8$/NiCF and NSCG/S$_8$/CF electrodes exhibit two cathodic peaks and one anodic peak as shown in FIG. 28. The two representative cathodic peaks originate from the reduction of elemental sulfur to soluble lithium polysulfides (Li$_2$Sx, 4≤x≤8) at the higher potential and the formation of insoluble lithium sulphides (Li$_2$S$_2$/Li$_2$S) at the lower potential, respectively. When scanning back, one anodic peak shows the oxidation of Li$_2$S to S$_8$. The lower oxidation potential and higher reduction potential always reflect lower polarization and faster redox rates in electrochemical systems. Compared to NSCG/S$_8$/CF electrodes, NSCG/S$_8$/NiCF electrodes reveal the large upshift (2.24 V→2.36 V; 1.89 V→2.00 V) of the two reduction peaks and the downshift (2.55 V→2.44 V) of the oxidation peak, which indicates that the introduction of polar Ni coating on CF can efficiently catalyze the reduction/oxidation of soluble polysulfides. In addition, NSCG/S$_8$/NiCF electrodes also exhibit much narrower and sharper redox peaks than that of NSCG/S$_8$/CF and Super_P/S$_8$/Al, reconfirming the reduced polarization and rapid redox kinetics as shown in FIGS. 29A-29C.

Stable and high capacity sulfur cathodes require not only rapid reduction/oxidation kinetics of soluble polysulfides, but also efficient absorption/decomposition of solid Li$_2$S. In principle, highly-reversible charge/discharge characteristics of the sulfur/Li$_2$S cathode requires the large adsorption energy and small decomposition energy of Li$_2$S. From the density functional theory (DFT) simulation, the Ni surface can immobilize lithium sulfides (Li$_2$S) more effectively in addition to the catalytic effect of polysulfides. It is known that carbon surface has low affinity to Li$_2$S. Therefore, the absorption and decomposition energies of on various modeling slabs including RGO, nitrogen doped graphene (NGr), NSCG, and Ni (111) are further shown in FIG. 30 and Table 1. Notably, the thin slab of Ni (111) with a large adsorption energy of −3.51 eV and a tiny decomposition energy barrier of 0.2 eV for Li$_2$S facilitates the rapid oxidation of Li$_2$S back to sulfur.

TABLE 1

| Model of metal Ni | Ni atomic layers | Total energy (eV) | Surface energy (eV) |
|---|---|---|---|
| Bulk Ni | ∞ | −21.86 | NA |
| Ni (111) slabs | 4 | −82.29 | 0.119 |
|  | 7 | −148.00 | 0.116 |
|  | 10 | −213.54 | 0.116 |
| Ni (100) slabs | 3 | −19.37 | 1.083 |
|  | 5 | −51.20 | 0.280 |
|  | 7 | −73.11 | 0.277 |
| Ni (110) slabs | 5 | −49.67 | 0.286 |
|  | 7 | −71.48 | 0.289 |
|  | 9 | −93.35 | 0.289 |

Figure 30:
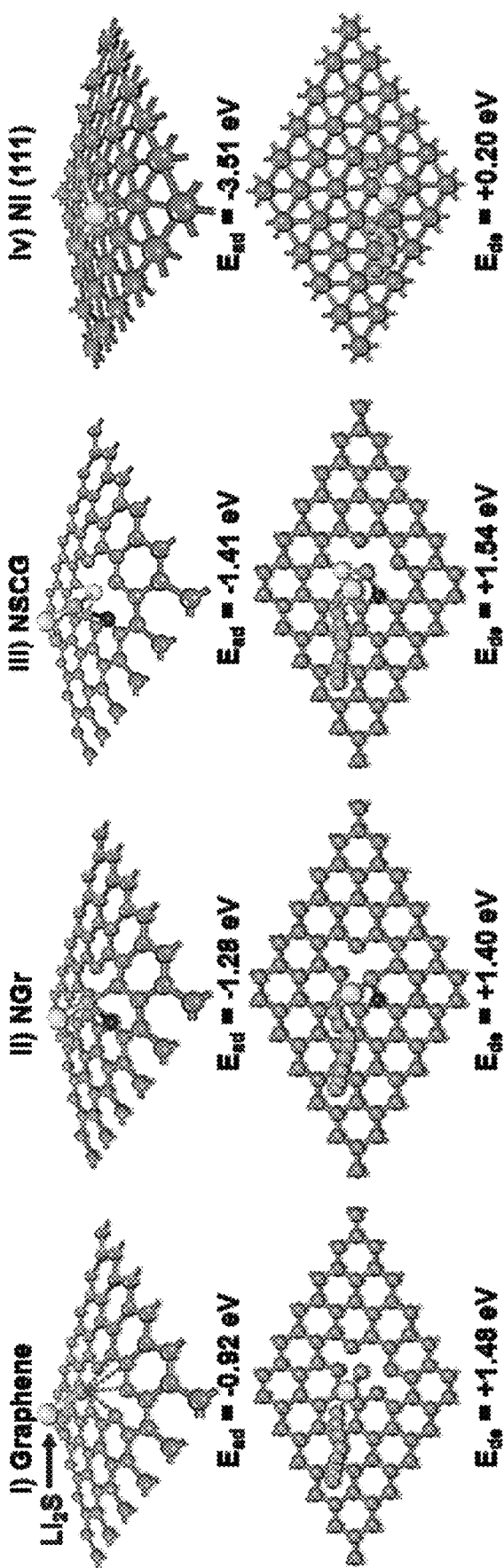
FIG. 30 shows a theoretical calculation of the adsorption and decomposition energies of $Li_2S$ on the surface of RGO, NGr, NSCG, and the thin slab of Ni (111)

Compared to that of RGO (0.92 eV) and NGr (1.28 eV), the higher binding affinity of NSCG (1.41 eV) with Li$_2$S indicates the incorporation of N and S heteroatoms can improve the deposition of polar Li$_2$S onto the nonpolar graphene surface. Compared to RGO, NGr, and NSCG, the thin slab of Ni (111) exhibits the much stronger binding energy (3.51 eV) with polar Li$_2$S and subsequently forms three S—Ni chemical bonds. On the other hand, the decomposition energies of Li$_2$S on the surface of RGO, NGr, NSCG, and the thin slab of Ni (111) were calculated to be 1.48 eV, 1.40 eV, 1.54 eV, and 0.20 eV, respectively. Notably, an intact Li$_2$S molecule is decomposed into an LiS cluster and a single Li$^+$ (Li$_2$S→LiS+Li$^+$+e$^-$). As shown in FIG. 30, the Li$^+$ rapidly diffuses far from the sulfur atom of Li$_2$S and finally stabilizes at the center of C/Ni rings, which is accompanied by the breakage of the Li—S bond. Compared to graphene materials, the thin slab of Ni (111) exhibits the lowest decomposition energy barrier, suggesting the efficiently catalytical effect of Ni on Li$_2$S decomposition. In other words, the efficient absorption and decomposition capability of the Ni layer significantly facilitates the oxidation of Li$_2$S back to sulfur. Therefore, the Ni-coated layer of NSCG/S$_8$/NiCF can simultaneously speed up the redox kinetics of soluble polysulfides and solid Li$_2$S, subsequently resulting in high sulfur recycling utilization.

Cycling Stability and Flexibility of Li—S Full Batteries

Figure 31:
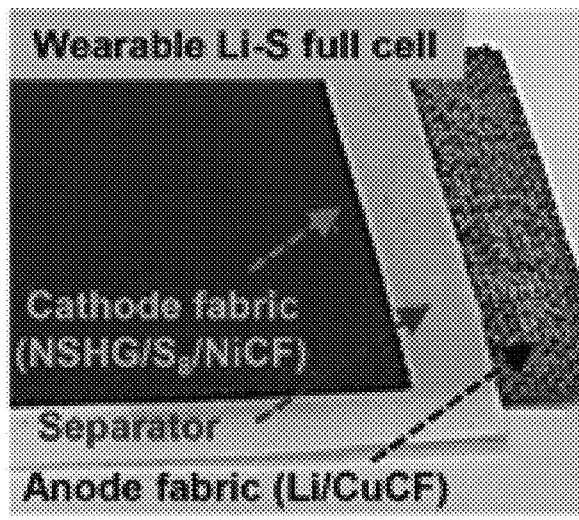
FIG. 31 shows a digital picture of the inner cell configuration in full-cell Li—S batteries.
Figure 32:
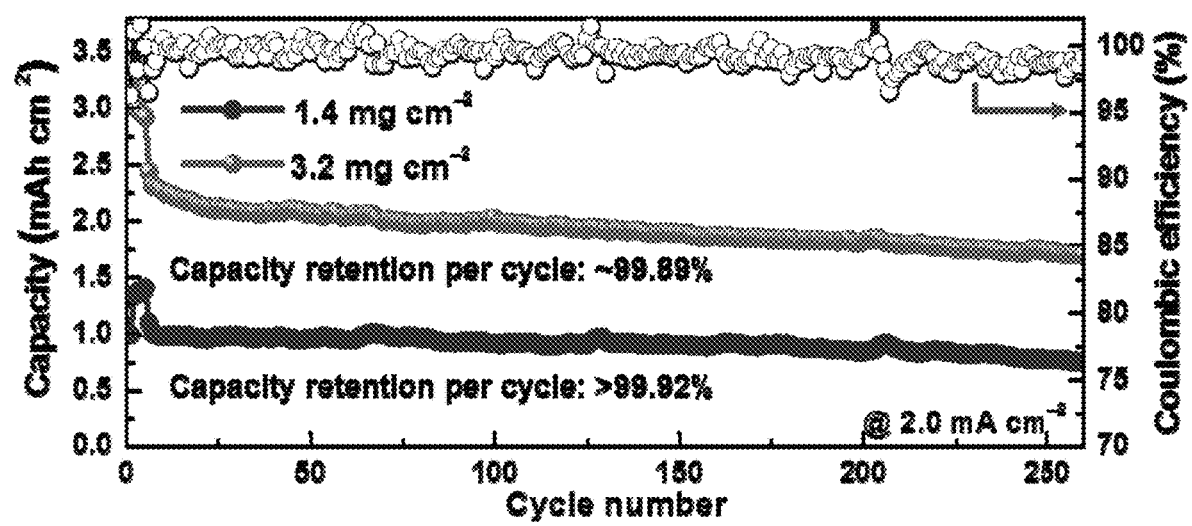
FIG. 32 shows cycling stability of Li—S full batteries at high current densities of 1.0 mA $cm^{-2}$ and 2.0 mA $cm^{-2}$.

The high flexibility, high capacity and electrochemical stability of Li/CuCF and NSCG/S$_8$/NiCF cathode are highly suitable for making high energy flexible Li—S full battery cells. The two fabric electrodes were stacked with a polypropylene separator to fabricate the full battery as shown in FIG. 31. A flexible microporous separator was used for separating two kinds of composite fabrics (NSCG/S$_8$/NiCF as cathode and Li/CuCF as anode). NSCG/S$_8$/NiCF cathodes with different sulfur loadings of 1.4 mg cm$^{-2}$ and 3.2 mg cm$^{-2}$ were paired with a limited amount of Li/CuCF anode (6.0 mAh cm$^{-2}$) as shown in FIG. 32. The sulfur cathode of NSHG/S$_8$/NiCF with different sulfur loadings of 1.4 mg cm$^{-2}$ and 3.2 mg cm$^{-2}$ was paired with a limited amount of Li/CuCF (6.0 mAh cm$^{-2}$) to study the cycling performance. The electrochemical properties of the as-made Li—S full batteries under different current densities are summarized in Table 2 showing performance metrics of the achieved wearable Li—S full batteries. The gravimetric and volumetric densities were calculated based on the total weight and volume of the entire battery including current collector, electrode, separator, and electrolyte.

Both batteries with high and low mass loading show remarkable cell capacity and stability. For example, the Li—S battery with 3.2 mg cm$^{-2}$ sulfur cathode exhibits high capacities of 3.8 mAh cm$^{-2}$, 3.0 mAh cm$^{-2}$ and 2.4 mAh cm$^{-2}$ at 0.5 mA cm$^{-2}$, 1.0 mA cm$^{-2}$ and at 2.0 mA cm$^{-2}$, respectively. At a practical current density of 1.0 mA cm$^{-2}$, the cell provides high areal energy density of 6.3 mWh cm$^{-2}$, gravimetric energy density of 288 Wh kg$^{-1}$, and volumetric energy density of 360 Wh L$^{-1}$ as shown in Table 2.

TABLE 2

| Current (mA cm$^{-2}$) | Cell weight (mg cm$^{-2}$) | Cell volume (cm$^{-3}$) | Areal capacity (mAh cm$^{-2}$) | Areal energy (mWh cm$^{-2}$) | Gravimetric energy (Wh kg$^{-1}$) | Volumetric energy (Wh L$^{-1}$) |
|---|---|---|---|---|---|---|
| 0.5 | 19.28 | 0.0175 | 1.4 | 2.94 | 152 | 168 |
| 1.0 | 19.28 | 0.0175 | 1.0 | 2.1 | 109 | 120 |
| 0.5 | 23.28 | 0.0175 | 3.8 | 8.0 | 344 | 457 |
| 1.0 | 21.88 | 0.0175 | 3.0 | 6.3 | 288 | 360 |
| 2.0 | 21.88 | 0.0175 | 2.4 | 5.04 | 230 | 288 |

Experimentally, the electrode mass of Li/CuCF anode with high areal capacities of 6.0 mAh cm$^{-2}$ was measured to be 8.6 mg cm$^{-2}$. To increase the areal capacity of Li—S full batteries, the NSCG/S$_8$/NiCF cathode with various electrode mass of 10.5 mg cm$^{-2}$, 13.1 mg cm$^{-2}$, and 14.5 mg cm$^{-2}$ was prepared to pair with the Li/CuCF anode. The measured thickness of metallic fabrics/electrodes was ~150 μm under standard stress (400 N cm$^{-2}$, a pressure used for the compression of standard coin cells). The thickness of the separator was typically ~25 μm.

All the corresponding battery metrics are much higher than the state-of-the-art flexible LIBs reported to date as shown in Table 3 showing performance comparison of the batteries of the present disclosure and current state-of-the-art flexible lithium ion batteries (capable of multiple bending at the curvature of <30 mm). The Li—S full battery with limited Li anode can be cycled up to 260 cycles with a capacity retention of 99.89% per cycle at a high current density of 2.0 mA cm$^{-2}$. The Li—S battery with sulfur loading of 1.4 mg cm$^{-2}$ also provided a good capacity of 1.0 mAh cm$^{-2}$ and an even higher capacity retention of 99.92% per cycle over 260 cycles.

TABLE 3

| Collector | Anode | Cathode | Areal capacity (mAh cm$^{-2}$) | Areal energy (mWh cm$^{-2}$) | Energy density (Wh kg$^{-1}$) | Energy density (Wh L$^{-1}$) | Cycle no. |
|---|---|---|---|---|---|---|---|
| CNTs | Li$_4$Ti$_5$O$_{12}$ | LiCoO$_2$ | 0.7 | 1.61 (2.3 V) | 108 | 98 | 20 |
| Graphene (Gr) | Lithiated-Gr | V$_2$O$_5$ | 0.015 | 0.03 (2.1 V) | 136 | 10 | 185 |
| Carbon fabrics | Li$_4$Ti$_5$O$_{12}$ | LiFePO$_4$ | 0.5 | 0.95 (1.9 V) | 114 | 101 | 80 |
| Cu/Al foils | Li$_4$Ti$_5$O$_{12}$ | LiFePO$_4$ | 0.94 | 1.69 (1.8 V) | NA | 100 | NA |
| Cu/Al foils | Graphite | LiNi$_{0.8}$Co$_{0.15}$Al$_{0.05}$O$_2$ | 0.4 | 1.48 (3.7 V) | 118 | NA | 50 |
| Cu/Al foils | Li foil | LiCoO$_2$ | 0.1 | 0.4 (4.0 V) | NA | NA | 100 |
| CuCF, NiCF | Li/CuCF | NSHG/S$_8$/NiCF | 3.0 | 6.3 (2.1 V) | 288 | 360 | 5 |
| CuCF, NiCF | Li/CuCF | NSHG/S$_8$/NiCF | 2.4 | 5.0 (2.1 V) | 230 | 288 | 260 |

Figure 33:
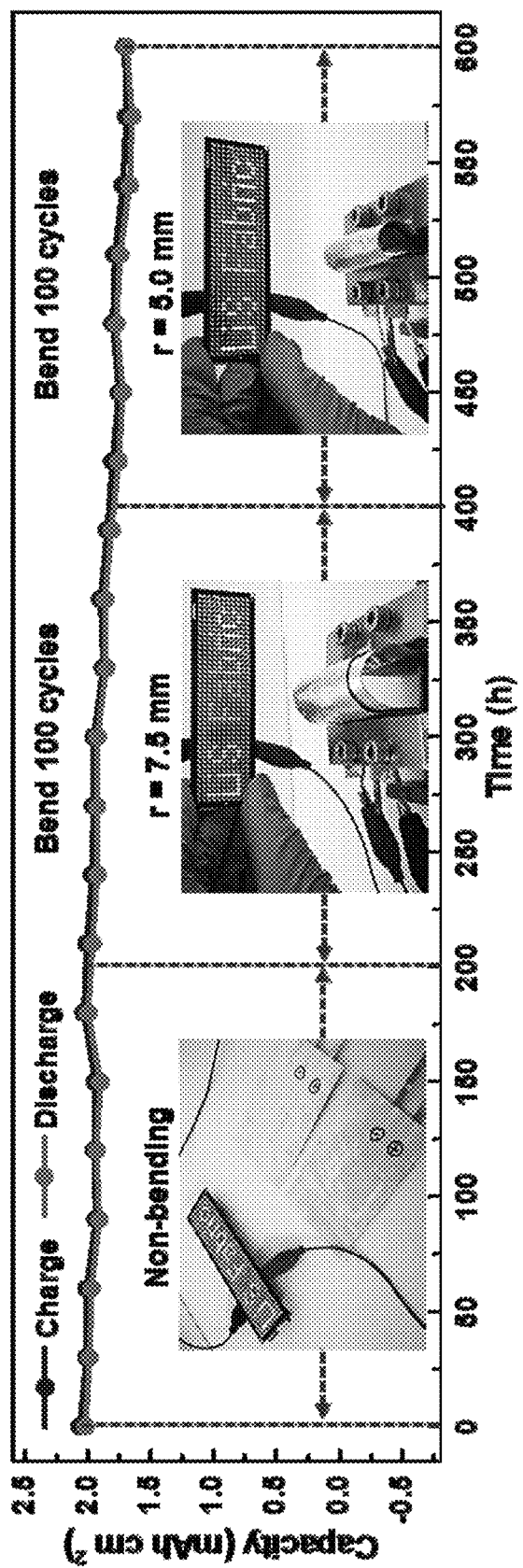
FIG. 33 shows charge/discharge areal capacities of Li—S full batteries with a size of 4.0 $cm^{-2}$ are recorded at 1.0 mA $cm^{-2}$ for 150 cycles, during which 200 repeating bents at 5.0 mm radius are carried out.

The Li—S full battery is ideal for flexible and wearable applications. To demonstrate this application, two batteries of a size of 4.0 cm$^{-2}$ were connected in series to yield an open circuit voltage of 4.2 V and a high areal capacity of 4.0 mAh cm$^{-2}$. The tandem cell was used to power a screen consisting of 264 light-emitting diodes (LED)s (trigger voltage: 3.7 V; size: 10×3.0 cm$^{-2}$) that displayed a clear caption of "Li S Fabric" as shown in FIG. 33. The LED screen exhibited stable brightness during and after repeatedly bending the battery at small radii of curvatures of 7.5 mm and 5.0 mm for tens of minutes. The array screen could display a clear caption of "Li S Fabric", although the Li—S batteries as a power supplier were harshly bended at various bending radius of i) r=∞, ii) r=7.5 mm, iii) r=5.0 mm, as shown in the inset. The charge/discharge characteristics of the battery was 1.0 mA cm$^{-2}$ for 150 cycles, during which time the batter was bent 200 times at 5.0 mm radius. Again, the high capacity retention of ~99.5% and small fluctuations during mechanical bending indicate the excellent mechanical stability of Li—S full batteries.

As demonstrated above, flexible Li—S full cells with stable battery cycling are provided. With only 100% excess of Li, the Li—S full cells exhibit high energy density (6.3 mWh cm$^{-2}$), high areal capacity (3.0 mAh cm$^{-2}$), large current density (2.0 mA cm$^{-2}$) and excellent cycling stability (capacity retention per cycle: 99.89% for 260 cycles). The Li—S full cells maintain stable charge/discharge characteristics while being repeatedly bent at small radii of curvature. The excellent electrochemical performance and mechanical flexibility of Li—S full batteries are ascribed to the unique design of fabric-typed electrodes as follows. The fabric structure of CF simultaneously endows mechanical flexibility and reduces local current density of the electrodes. More importantly, the metal coating on CF significantly stabilize the electrode materials to reach remarkable CEs. On the anode side, Cu protective layers not only effectively prevent side reaction between Li and CF surface, but also stabilize SEI layer by reducing the local current density during cycling. The Cu coating renders uniform deposition of Li nanosheets instead of dendrites and leads to an average CE of 99.42% over 400 charge-discharge cycles. On the cathode side, catalytic Ni layers effectively catalyze the reduction of soluble polysulfides and the absorption-dissociation of Li$_2$S end-product, which enables excellent capacity retention 99.82% over 400 cycles. As a result, the trade-off between electrochemical performance and mechanical flexibility of Li—S batteries is successfully resolved by the employment of rationally design metallic fabrics Preparation of CuCF and NiCF Commercially available CFs were immersed into a mixture of concentrated H$_2$SO$_4$/HNO$_3$ (v/v=3:1) and then sonicated at 60° C. for 1 hr. Then the acid-treated CFs were rinsed with deionized (DI) water (>18.0 MΩ·cm) several times and dried at 80° C. for 10 min. For ELD of Ni or Cu, the retreated CFs were immersed into 10% (v/v) vinyltrimethoxysilane in ethanol for 1 hr to affect the silanization of the CF surface. The silanized CFs were then dipped into an aqueous mixture of [2-(methacryloyloxy) ethyl] trimethyl ammonium chloride (METAC) (20% v/v) and potassium persulfate (100 mg), followed by free-radical polymerization at 80° C. for 1 hr. Then, the PMETAC-coated CFs were rinsed using DI water for several times and dried at 80° C. for 10 min. After that, PMETAC-coated CFs were immersed into a 5×10$^{-3}$ M (NH$_4$)$_2$PdCl$_4$ aqueous solution and kept for 20 min for loading [PdCl$_4$]$^{2-}$ in a dark environment. Finally, the [PdCl$_4$]$^{2-}$ loaded CFs were individually immersed into the ELD bath of Ni or Cu for 50 min, in which a corresponding thin metal layer was deposited onto the surface of CFs. The ELD of Cu was performed in a plating bath consisting of a 1:1 (v/v) mixture of solution A and B. Solution A contains NaOH (12 g/L), CuSO$_4$.5H$_2$O (13 g/L), and KNaC$_4$H$_4$O$_6$.4H$_2$O (29 g/L) in DI water. Solution B is a HCHO (9.5 mL/L) aqueous solution. The ELD of Ni was performed in a plating bath consisting of a 10:1 (v/v) mixture of solution A and freshly prepared B. Solution A contains Ni$_2$SO$_4$.5H$_2$O (40 g/L), sodium citrate (20 g/L), and lactic acid (10 g/L) in DI water (pH=7.5). Solution B is a dimethylamine borane (7.5 g/L) aqueous solution. All ELD experiments were carried out at room temperature.

Preparation of Li/CuCF Anode

The CuCF was cut into a certain size and shape to serve as the working electrode, a Celgard 2500 membrane as the separator and a lithium foil as the counter/reference electrode in the sandwiched cell. The prepared electrolyte is 1M lithium bis(trifluoromethanesulfonyl)imide (LiTFSI) in a mixture solution of 1,3-dioxolane (DOL) and 1,2-dimethoxyethane (DME) (1:1, vol. ratio) with 2% LiNO$_3$ additives. The cell was firstly cycled at 0-1.0 V (Li$^+$/Li) at 1.0 mA cm$^{-2}$ for five cycles to activate the cuprous oxide from cladding metallic layers. Then the required Li metal was deposited inside CuCF at 1.0 mA cm$^{-2}$ to obtain the Li/CuCF anode, which is easily extracted from the open cell. Here, the partial Li$^+$ was inserted into CF by passing through metallic layer and the content of inserted Li$^+$ might be easily controlled by changing the lithiation current.

Figure 34:
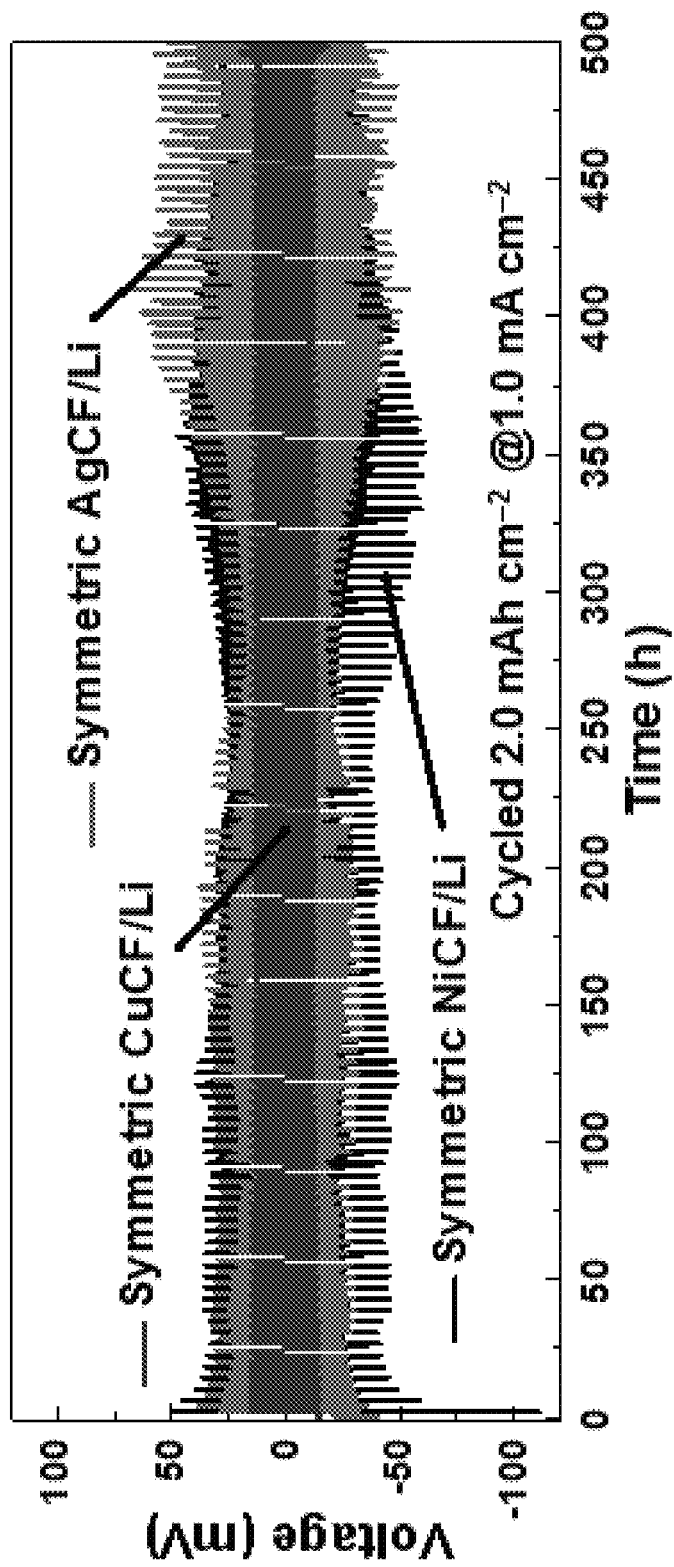
FIG. 34 shows galvanostatic plating/stripping profiles in Li/NiCF, Li/AgCF and Li/CuCF symmetric cells.

Apart from copper, other metals (e.g. nickel, silver, zinc or gold) can be used. As shown in FIG. 34, Li/NiCF, Li/AgCF and Li/CuCF symmetric cells are workable under the galvanostatic plating/stripping cycling, meanwhile, Li/CuCF symmetric cell shows better results among the others.

Preparation of NSCG

Graphite oxide was synthesized from natural graphite powder according to the modified Hummers method. Graphite oxide (GO) powder was sonicated in DI water for half an hour to yield GO solution with a concentration of 2.0 mg ml$^{-1}$. In brief, an aqueous dispersion of GO (2 mg mL$^{-1}$) with 2-amino thiazole in a weight ratio of 1:2 was stirred at ambient temperature to obtain amino thiazole functionalized GO. Then the mixture was sealed in a 100 ml Teflon-lined stainless-steel autoclave for hydrothermal reaction at 160° C. for 12 hr. The obtained black hydrogel was immersed into DI water several times to remove the residual 2-amino thiazole and dried in the oven at 50° C. to obtain a loose NSCG sponge. For a control experiment, NG was prepared using the same procedure by adding equal amount of ethylene diamine. RGO sponge was also prepared through the same procedure without adding any dopants.

Table 4 shows the comparison of atomic concentration between various polar binders including RGO, NGr, and NSCG according to certain embodiments.

TABLE 4

| Atomic concentration | [C at %] | [O at %] | [N at %] | [S at %] |
|---|---|---|---|---|
| RGO | 83.8% | 13.4% | 2.8% | NA |
| NGr | 80.3% | 13.2% | 6.5% | NA |
| NSCG | 69.1% | 11.8% | 8.9% | 10.2% |

Preparation of NSCG/Ss/NiCF Cathode

The Ss@carbon black nanoparticle hybrid was prepared following a melt-diffusion strategy. Commercial Ss Powders and carbon black nanoparticles were grounded together based on the optimal weight ratio of 4:1. Then the hybrid was heated to 155° C. and maintained for 12 hr. Homogeneous sulfur-containing ink was fabricated by mixing 1.05 g sulfur hybrid and 0.15 g NSCG in N-methyl-2-pyrrolidone (NMP) solvent followed by high power ultrasonication for 60 min. The as-prepared NiCF was then immersed into the concentrated ink for 10 s and removed from the ink. Finally, the NSCG/S$_8$/NiCF composite was obtained by drying in a vacuum oven at 60° C. overnight. The concentration of the ink was tuned by varying the amount of NMP to obtain different sulfur mass loading.

Assembling of the Flexible Li—S Full Battery Cell

The fully flexible Li—S battery cell was encapsulated with commercial soft Al-plastic film in an argon-filled glove box using the NSCG/S$_8$/NiCF composite as cathode, a microporous membrane as separator and the Li/CuCF composite as anode. The electrolyte of 1M LiTFSI in DOL/DME with 2 wt % LiNO$_3$ is appropriately added according to the electrode size (40 uL cm$^{-2}$).

Structural Characterization

The surface morphology of the electrodes was examined using field emission scanning electron microscopy (FESEM, JSM6335F, JEOL, Japan). The microstructure of the NSCG/S$_8$/NiCF composite was investigated by high resolution transmission electron microscope (HR-TEM, JEM-2011, JEOL, Japan). The NSCG/S$_8$/NiCF composite was sonicated in ethanol for 5 min and the suspension was dropped in a 200 mesh Cu grid. The elemental mapping of sulfur cathodes was performed using electron probe micro-analyzer (EPMA-1600, Shimadzu, Japan). The stress-strain curve of CuCF and NiCF was obtained using an Instron 5565A tester. In-situ resistance-strain measurements were carried out by a two-probe method through a Keithley 2400 sourcemeter. The chemical structure and composition were investigated by high resolution X-ray photoelectron spectroscopy (XPS, Axis Ultra, Kratos) with a monochromated Al—Kα (1486.6 eV) excitation source. Raman spectroscopy was performed using a BaySpec Nomadic Raman system with a laser wavelength of 532 nm.

Electrochemical Measurements

Stainless steel coin cells and soft-packaged cells were assembled in an Ar-filled glovebox with oxygen and moisture content <1 ppm. In the cathodic and anodic half cells, the electrochemical performances of NSCG/S$_8$/NiCF and Li/CuCF composites were individually evaluated by galvanostatic cycling of 2032-typed coin cell with the same amount (40 μL cm$^{-2}$) of electrolyte. Galvanostatic cycling of the electrodes were conducted on Arbin and Neware battery testing systems. Cyclic voltammetry measurements were performed on a CHI660e electrochemical workstation.

Theoretical Calculation

All theoretical calculations were performed using the Vienna ab initio simulation package code based on the first-principles of density functional theory (DFT) framework. The projector augmented wave pseudopotentials were applied to describe the electron-ion interactions. The electronic exchange correlation interaction effect was evaluated through the generalized gradient approximation with Perdew-Burke-Ernzerhof exchange-correlation function. A cut-off energy of 450 eV was employed for the plane wave basis to ensure convergence. All the structures were optimized with energy and force convergence criterions of 0.01 meV and 0.02 eV/Å, respectively. A vacuum slab of 20 Å was applied to exclude the interaction between all the corresponding slabs. A single layer graphene of a 4×4 supercell size with two-point defects was adopted as the model for non-doped reduced graphene oxide. Herein, the pyridinic nitrogen and thiophene-like sulfur were used as representative dopants for N, S co-doped graphene. In addition, a corresponding 4×4 supercell size Ni slab with optimized thickness (Explained in the Supplementary Table 3) was also adopted as the model for thin layer Ni-coated fabric. The vdW-DF2 correction was adopted in the simulation of absorption and decomposition processes by automatically adding the physical van der Waals interaction. The adsorption energy ($E_{ad}$) for Li$_2$S in various surface slabs are defined as the below equation: $E_{ad}=E_{total}-E_{ads}-E_{suf}$, where $E_{total}$ is the total energy of the adsorbed system, $E_{ads}$ is the energy of the adsorbate in vacuum and $E_{suf}$ is the energy of the optimized clean surface slabs. The climbing image nudged elastic band (CI-NEB) method was applied for computing the decomposition barrier ($E_{de}$) and the Li$^+$ diffusion process of Li$_2$S (Li$_2$S→LiS+Li$^+$+e$^-$).

The use of metal-coated CF host comprising of a core of graphitic carbon fabric and a protective metallic shell as Li anode host simultaneously guarantees the excellent hybrid storage behavior (Li ions intercalation and Li metal plating). The highly conductive metal-coated CF host comprising a core of graphitic carbon fabric and a protective metallic shell allow high lithophilic properties via lithium intercalated carbon and simultaneously guarantee the stable lithium metal plating/stripping through an inert metal protective shell. As a result, the problem of low coulombic efficiency and the gradual increase of overpotential at Li anode can be solved.

In addition, the metal-coated CF host with high surface area and excellent porosity not only accommodates volume changes during Li plating/stripping process, but effectively delays the dendrite formation time. As a result, the thermal runway and explosion hazards caused by Li dendrite can be solved. The Li/CuCF as anode shows much higher coulombic efficiency, reduced overpotential and dendrite-free plating/stripping behaviors for improving cell operation safety and long cyclability.

The NiCF host is an effective electrochemical catalyst for the enhancement of polysulfides redox kinetics. The dissolution of polysulfides and related low coulombic efficiency at sulfur cathode side can be solved. The use of three-dimensional hierarchical NSCG/S$_8$/NiCF composite as cathode for lithium sulfur batteries allows better polysulfides anchoring effects, resulting in high coulombic efficiency and long cyclability.

The metal-coated fabric electrodes are applicable for flexible batteries due to their lightweight, wear-resistance, high conductivity, and durable fabric-like flexibility. The lithium anode is applicable for lithium ion batteries, lithium oxygen batteries and other lithium metal batteries. The sulfur cathode is applicable for Na—S and Mg—S batteries.

Although the invention has been described in terms of certain embodiments, other embodiments apparent to those of ordinary skill in the art are also within the scope of this invention. Accordingly, the scope of the invention is intended to be defined only by the claims which follow.

What is claimed is:
1. An electrode for a battery comprising:
lithium metal; and
a metal-coated carbon fabric having a three-dimensional porous structure and comprising carbon fibers, a copper layer, and an interfacial polymer layer sandwiched between the carbon fibers and the copper layer, the interfacial polymer layer being an interfacial poly[2-(methacryloyloxy) ethyl]trimethyl ammonium chloride

(PMETAC) layer for bonding the copper layer to each of the carbon fibers thereby forming the metal-coated carbon fabric;

wherein each of the carbon fibers comprises a diameter in a range of 5 μm to 20 μm, wherein the copper layer comprises copper nanoparticles for enhancing affinity to the lithium metal and confining deposit of the lithium metal, the copper nanoparticles fully covering a surface of the metal-coated carbon fabric;

wherein the lithium metal is attached to the copper layer;

wherein a portion of the lithium metal has a two-dimensional nanostructure and is in a form of a flake; and wherein the flake has a lateral dimension in a range of 1 μm to 5 μm and a thickness in a range of 1-100 nm.

2. The electrode of claim 1, wherein the copper layer has a thickness in a range of 50 nm to 300 nm.

3. The electrode of claim 1, wherein the lithium metal is further present in pores in the carbon fabric.

4. A lithium metal sulfur battery comprising an anode and a cathode, the anode comprising the electrode of claim 1; and the cathode comprising:

a sulfur composite comprising a conductive binder and sulfur; and a further carbon fabric comprising further carbon fibers, the further carbon fibers being at least partially covered by a nickel layer, wherein the sulfur composite is attached to the nickel layer.

5. The lithium metal sulfur battery of claim 4, wherein the conductive binder is a nitrogen and sulfur co-doped graphene; and the sulfur composite further comprises carbon black.

\* \* \* \* \*